US012272244B2

(12) United States Patent
Nakamura

(10) Patent No.: US 12,272,244 B2
(45) Date of Patent: Apr. 8, 2025

(54) INFORMATION PROCESSING DEVICE, INFORMATION PROCESSING METHOD, AND PROGRAM

(71) Applicant: Nissan Motor Co., Ltd., Kanagawa (JP)

(72) Inventor: Mitsunori Nakamura, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 337 days.

(21) Appl. No.: 17/597,589

(22) PCT Filed: Jul. 12, 2019

(86) PCT No.: PCT/IB2019/000700
§ 371 (c)(1),
(2) Date: Jan. 12, 2022

(87) PCT Pub. No.: WO2021/009531
PCT Pub. Date: Jan. 21, 2021

(65) Prior Publication Data

US 2022/0319327 A1 Oct. 6, 2022

(51) Int. Cl.

| | |
|---|---|
| ***G08G 1/16*** | (2006.01) |
| ***G08G 1/01*** | (2006.01) |
| ***G08G 1/09*** | (2006.01) |
| ***G08G 1/0967*** | (2006.01) |

(52) U.S. Cl.
CPC ........... *G08G 1/164* (2013.01); *G08G 1/0112* (2013.01); *G08G 1/0141* (2013.01); *G08G 1/0145* (2013.01); *G08G 1/096791* (2013.01); *G08G 1/166* (2013.01)

(58) Field of Classification Search
CPC .... G08G 1/164; G08G 1/0112; G08G 1/0141; G08G 1/0145; G08G 1/096791; G08G 1/166; G08G 1/163; G08G 1/167; G08G 1/162; G08G 1/0968
See application file for complete search history.

(56) References Cited

U.S. PATENT DOCUMENTS

| | | | | |
|---|---|---|---|---|
| 9,767,693 | B2 | 9/2017 | Lee et al. | |
| 10,115,312 | B2 | 10/2018 | Lee et al. | |
| 11,024,164 | B2 | 6/2021 | Lin et al. | |
| 2013/0018572 | A1 * | 1/2013 | Jang | G08G 1/164 701/119 |
| 2014/0019005 | A1 | 1/2014 | Lee et al. | |
| 2016/0054441 | A1 | 2/2016 | Kuo et al. | |

(Continued)

FOREIGN PATENT DOCUMENTS

| | | | |
|---|---|---|---|
| CN | 107564306 | A | 1/2018 |
| CN | 107749193 | A | 3/2018 |

(Continued)

*Primary Examiner* — Rodney A Butler
(74) *Attorney, Agent, or Firm* — Osha Bergman Watanabe & Burton LLP

(57) ABSTRACT

A collision risk calculation unit (12) calculates a collision risk between a vehicle B and each of a plurality of objects C to G present in a traveling direction of the vehicle B. An object selection unit (13) determines a transmission order of pieces of information on the individual objects C to G based on the collision risk, and transmits the pieces of object information to the vehicle B based on the transmission order.

20 Claims, 22 Drawing Sheets

(56) References Cited

U.S. PATENT DOCUMENTS

| | | | | |
|---|---|---|---|---|
| 2017/0004366 | A1 | 1/2017 | Nakata | |
| 2017/0352277 | A1 | 12/2017 | Lee et al. | |
| 2018/0151070 | A1 | 5/2018 | Katou et al. | |
| 2018/0151077 | A1 | 5/2018 | Lee | |
| 2018/0327029 | A1* | 11/2018 | Oooka | G08G 1/163 |
| 2019/0061750 | A1* | 2/2019 | Tamura | B60W 30/0956 |
| 2020/0043339 | A1* | 2/2020 | Kozaki | G08G 1/056 |
| 2020/0086855 | A1* | 3/2020 | Packer | G08G 1/166 |
| 2020/0209871 | A1 | 7/2020 | Xiong et al. | |
| 2020/0219387 | A1 | 7/2020 | Lin et al. | |
| 2021/0264224 | A1* | 8/2021 | Tamaoki | G01S 7/411 |

FOREIGN PATENT DOCUMENTS

| | | | |
|---|---|---|---|
| DE | 102011078615 | A1 | 1/2013 |
| JP | 2004054369 | A | 2/2004 |
| JP | 2004-077281 | A | 3/2004 |
| JP | 2005-062912 | A | 3/2005 |
| JP | 2008011343 | A | 1/2008 |
| JP | 2008071062 | A | 1/2008 |
| JP | 2008299676 | A | 12/2008 |
| JP | 2009298193 | A | 12/2009 |
| JP | 2010073026 | A | 4/2010 |
| JP | 2012093883 | A | 5/2012 |
| JP | 2017016318 | A | 1/2017 |
| JP | 2017182563 | A | 10/2017 |
| JP | 2017182570 | A | 10/2017 |
| KR | 10-2014-0007709 | A | 1/2014 |
| KR | 10-2018-0023328 | A | 3/2018 |
| WO | 2018/140191 | A1 | 8/2018 |

* cited by examiner

FIG. 11

| | DISTANCE m | RELATIVE SPEED km/h | TTC | THW | MEDIAN STRIP | OBJECT IS ON PRIORITY ROAD | COLLISION ENVIRONMENT RISK | COLLISION RISK |
|---|---|---|---|---|---|---|---|---|
| CROSSING PEDESTRIAN H | 70 | START MOVING | NOT CALCULATED | – | – | – | HIGH | 3 |
| PRECEDING VEHICLE I | 20 | −20 | 3.7 | 1.4 | – | – | NORMAL | 1 |
| PRECEDING VEHICLE J | 200 | −30 | 19.4 | 14.8 | – | – | NORMAL | 5 |
| ONCOMING VEHICLE K | 20 | −100 | 0.7 | – | PRESENT | – | NO RISK | 7 |
| ONCOMING VEHICLE L | 60 | −100 | 2.2 | – | ABSENT | – | HIGH | 2 |
| ONCOMING VEHICLE M | 80 | START MOVING | – | – | ABSENT | – | HIGH | 4 |
| INTERSECTING VEHICLE N | 70 | 0 | NOT CALCULATED | – | – | NO | NORMAL | 6 |
| OBSTACLE O | 50 | −50 | 3.7 | 1.4 | – | – | NORMAL | 1 |

INFORMATION PROCESSING DEVICE, INFORMATION PROCESSING METHOD, AND PROGRAM

TECHNICAL FIELD

The present invention relates to a technique of determining a transmission order of pieces of information on objects present on a road.

BACKGROUND ART

Conventionally, a method has been known in which image information on a blind spot range which is a blind spot from a host-vehicle is received from another vehicle by using inter-vehicle communication (Patent Literature 1). The reception of the image information on the blind spot range from another vehicle can provide, to an occupant of the host-vehicle, information on the blind spot range which is invisible from the host-vehicle.

CITATION LIST

Patent Literature

Patent Literature 1. Japanese Unexamined Patent. Application Publication No. 2008-299676

SUMMARY OF THE INVENTION

Problems to be Solved by the Invention

However, even if the pieces of information on the blind spot range are transmitted, if the pieces of information are transmitted at random, there was a risk that all necessary pieces of information may not be received by a receiver vehicle until a time at which the receiver vehicle desires to use the pieces of information.

The present invention is made in view of the above described problems, and an object of the present invention is to transmit pieces object information in an order of object information necessary for a vehicle.

Means for Solving the Problem

An information processing device according to a first as of the present invention calculates a collision risk between a vehicle and each of a plurality of objects present in a traveling direction of the vehicle, and transmits, to the vehicle, pieces of information on the objects in a transmission order determined based on the collision risk.

Advantageous Effect of the Invention

According to the present invention, pieces of object information can be transmitted in an order of object information necessary for a vehicle.

BRIEF DESCRIPTION OF THE DRAWINGS

FIG. 11 is a diagram showing an example of information used at the time of calculating a collision risk.

MODES FOR CARRYING OUT THE INVENTION

First Embodiment

An information processing device 10 according to a First embodiment will be described with reference to FIG. 1.

The information processing device 10 receives, from a vehicle A, a current position of the vehicle A, and sensor data obtained by sensing space around the vehicle A, and receives, from a vehicle B, a current position of the vehicle B. The information processing device 10 detects objects that have risks of colliding with the vehicle B based on the sensor data, and transmits, to the vehicle B, pieces of information on the objects in a descending order of the degree of collision risk. Accordingly, the vehicle B can start generating a travel plan well in advance such that the vehicle travels by drawing a track of avoiding the objects on a road by using pieces of information on objects observable from another position such as a position of the vehicle A, in addition to information on objects detectable from the vehicle B. The information processing device 10 may receive the sensor data or the like not only from the vehicle A, but also from other vehicles or sensors installed around the road.

The vehicles A and B may be vehicles with or without an automatic driving function. The vehicles A and B may be vehicles capable of switching between automatic driving and manual driving.

Figure 1:
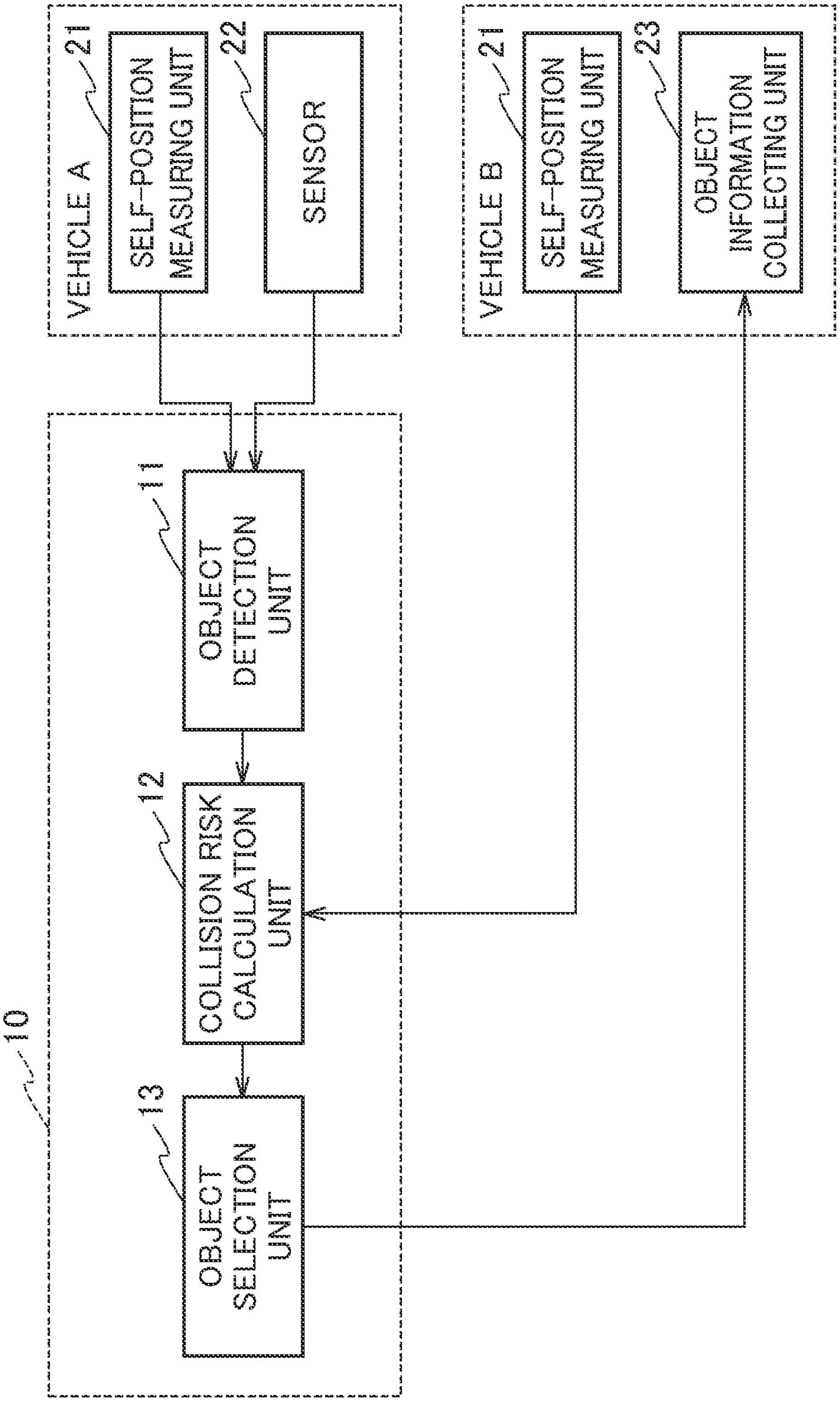
FIG. 1 is an overall configuration diagram including an information processing device according to a first embodiment.

The information processing device 10 shown in FIG. 1 includes an object detection unit 11, a collision risk calculation unit 12, and an object selection unit 13. Each unit of the information processing device 10 may be constituted from a controller and a communication circuit of the information processing device 10. The controller is a general-purpose computer that includes a central processing unit, a memory, and an input/output unit. A program may cause the controller to function as each unit of the information processing device 10. The program is stored in a storage device of the information processing device 10, and the program can be recorded on a recording medium such as a magnetic disk, an optical disk, or a semiconductor memory, or alternatively provided through a network.

The object detection unit 11 receives, from the vehicle A, position information on the vehicle A and the sensor data obtained by sensing space around the vehicle A. The object detection unit 11 outputs information on an object that is present in a traveling direction of the vehicle B based on the position information and the sensor data of the vehicle A, and the object information includes at least an object position and a detection time of the object and includes a speed, a state, a type and the like of the object. A coordinate system representing the object position is expressed by a travel distance from a reference point of a world geodetic system or a high-precision map by using the position information on the vehicle A received from the vehicle A. The state of the object is, for example, whether the object is stationary, whether the object is about to start, direction indicator information detected from a direction indicator, and the like. The type of the object is, for example, a kind of the object, such as whether the object is a vehicle, a pedestrian, a bicycle, an obstacle, or the like. By the object information including the type of the object, the vehicle B can take an appropriate action depending on the type of the object.

The collision risk calculation unit 12 receives, from the vehicle B, position information, a speed, and the like. The collision risk calculation unit 12 calculates a risk that each object collides with the vehicle B by using the position information and the speed of the vehicle B and the object information output by the object detection unit 11. The collision risk is a numerical value of the possibility that the vehicle B collides with each object. The collision risk calculation unit 12 calculates the collision risk based on, for example, the relationship between a lane on which the vehicle B travels, and a lane on which each object is present.

The object selection unit 13 selects pieces of object information to be transmitted to the vehicle B based on the collision risk calculated by the collision risk calculation unit 12, and determines the transmission order of the individual pieces of object information. The object selection unit 13 transmits the pieces of object information to the vehicle B in the determined transmission order. The transmission order is determined, for example, based on a margin time until the vehicle B collides with each object. The margin time is determined by dividing a relative distance by a relative speed.

The vehicle A includes a self-position measuring unit. 21 and a sensor 22.

The self-position measuring unit 21 measures and outputs the position information on the vehicle A. Specifically, the self-position measuring unit 21 receives Global Navigation. Satellite System. (GNSS) signals to measure a current time, and a self-position of the vehicle A. The self-position measuring unit 21 may measure the position information on the vehicle A based on other methods. The position information includes, for example, information on a position and an attitude of the vehicle A.

The sensor 22 senses objects present around the vehicle A. For example, a laser range finder can be used as the sensor 22. The laser range finder senses 360-degree space around the vehicle A within a viewable range of about 150 m, and outputs a sensing result as point cloud format data A visible light camera can be used as the sensor 22. The visible light camera photographs the space around the vehicle A, and outputs the photographed image data. The The light camera is installed so as to photograph, for example, each of space in a forward direction of the vehicle A, spaces on both side directions of the vehicle A, and space in a backward direction of the vehicle A. The sensor 22 transmits, to the information processing device 10, the point cloud format data and the image data as sensor data Other types of sensors may be used.

The vehicle B includes a self-position measuring unit 21 and an object information collecting unit 23.

The self-position measuring unit 21 measures and outputs position information on the vehicle B in the same manner as the self-position measuring unit 21 of the vehicle A.

The object information collecting unit 23 receives object information from the information processing device 10 to collect the information. The vehicle B can generate a traveling track plan of the vehicle B by using the object information collected by the object information collecting unit 23. The traveling track plan is, for example, a track of a vehicle so that the vehicle can take safety actions.

As same as the vehicle A, the vehicle B may include a sensor 22 to sense objects present around the vehicle B.

Figure 2:
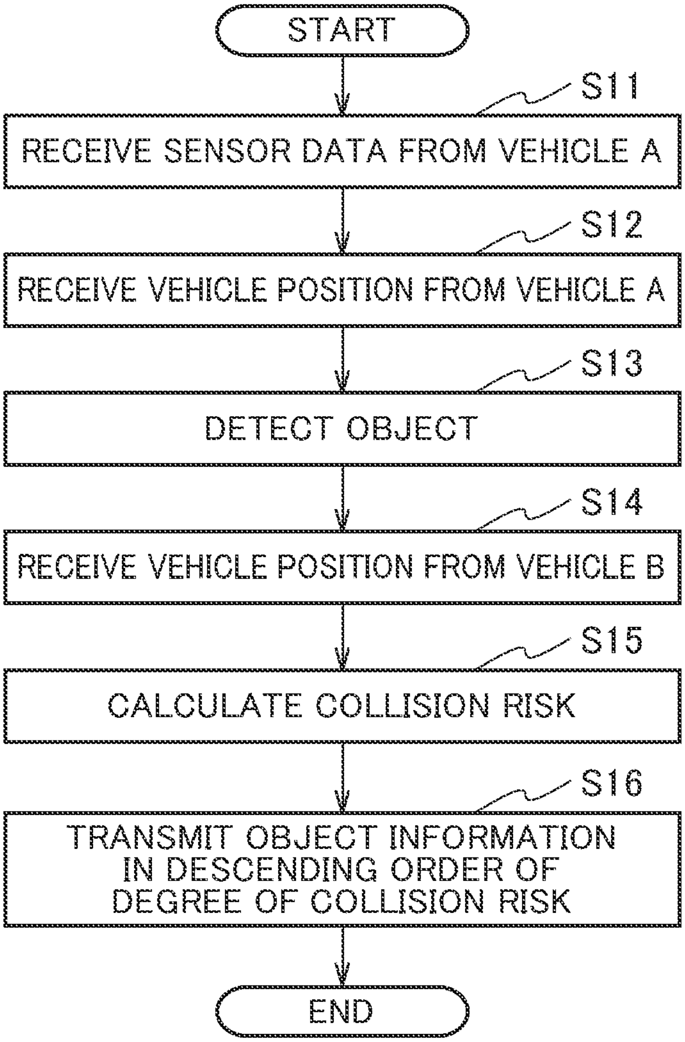
FIG. 2 is a flowchart showing flows of processes performed by an information processing device according to a first embodiment.

With reference to FIG. 2, flows of processes performed by the information processing device 10 according to the first embodiment will be described. It is assumed that the vehicle A travels on an opposite lane that is a lane in a direction opposite to a traveling direction of the vehicle B.

In steps S11 and S12, the object detection unit 11 receives, from the vehicle A, the sensor data and the position information. Table 1 shows an example of data structures of the sensor data and the position information transmitted from the vehicle A to the information processing device 10.

TABLE 1

| | |
|---|---|
| Header | Identification code of transmitter vehicle |
| | Basic message of transmitter vehicle |
| Content data | Object information |
| | Identification code of object |
| | Basic message of vehicle at the time of object detection |
| | Sensor information |
| | Detailed information on object |
| | 1) Geographical location of object |
| | (2) Date and time at which object is detected |
| | (3) Traveling direction and speed of object, and position of object on road on which object is present |
| | (4) Stationary duration of object |

TABLE 1-continued

| |
|---|
| (5) Type of object |
| (6) Size of object |
| (7) Detailed information on road structure |
| (8) Still image data, video data, and point cloud format data |
| Object information |
| : |

The data structure of Table 1 is configured and transmitted as one data stream, for example. The data stream includes a header part and a content data part. The header part stores an identification code of a transmitter vehicle (the vehicle A) which transmits the data stream and a basic message of the transmitter vehicle. The basic message of the transmitter vehicle includes, for example, various pieces of information on the vehicle, a date and a time at which the data was created, a geographical location, a traveling direction, and a speed of the vehicle, and a past road travel route and a future travel plan route of the vehicle. Information to be transmitted as the basic message may be in accordance with SAE J2945/1 ESN, or the like.

The content data part stores one or more pieces of object information. The object information includes an identification code of an object, a basic message of the vehicle at the time of object detection, sensor information, and detailed information on the object. The basic message of the vehicle at the time of object detection includes, for example, a date and a time at which the object is detected, and a geographical location, a traveling direction, and a speed of the vehicle. The sensor information is information on a sensor which detects the object. Described as the sensor information are an identification code, a type, and a sensing cycle of the sensor, a frame number of an image in which the object is detected, the number of frames of images to be transmitted, a visual axis and a view angle of a camera, and the identification accuracy of the object.

The detailed information on the object includes a geographical location of the object, a date and a time at which the object is detected, a traveling direction and a speed of the object, a stationary duration of the object, a type of the object, a size of the object, detailed information on a road structure, still image data, video data, and point cloud format data the geographical location of the object is a position of the object specified by latitude and longitude, a position of the object specified by a predetermined parameter (node or link) of a road map, and a position relative to a sensor or the like which detects the object. The type of the object is pieces of information indicating, for example, a person, a vehicle (a standard-sized vehicle, a large-sized vehicle, a two-wheel vehicle, or the like), a bicycle, a road structure, a road obstacle, and the like. The detailed information on the road structure is pieces of information on a road such as pieces of information on a road width, a lane width, the number of lanes, and a road alignment, and regulation information, and regulation vehicle speed information. The still image data, the video data and the point cloud format data are pieces of sensing data that include detected objects.

In step S13, the object detection unit 11 detects objects present around the vehicle A based on the sensor data and the position information on the vehicle A, and then, outputs, to the collision risk calculation unit 12, pieces of information on the detected objects and the information on the vehicle A.

In step S14, the collision risk calculation unit 12 receives the current position information on the vehicle B and information on a planned position where the vehicle B will travel in the future. These pieces of information on the vehicle B can be obtained by, for example, the information processing device 10 receiving the same data as in Table 1 from the vehicle B to obtain, from the basic message of the vehicle, a geographical location, a traveling direction, a speed of the vehicle B at a predetermined time, a past road travel route, and a future travel plan route. The processes of receiving the signals in steps S11, S12, and S14 may be performed at any time in a random order.

In step S15, the collision risk calculation unit 12 calculates a risk that each object collides with the vehicle B based on the current position information on the vehicle B, the information on the planned position where the vehicle B will travel in the future, the information on the vehicle A, and the information on the object detected by the vehicle A.

In step S16, the object selection unit 13 transmits, to the vehicle B, the pieces of object information in the order from an object having a high collision risk. The vehicle B receives the pieces of object information, and starts performing processes by using the received pieces of object information after all necessary pieces of object information are received.

The calculation of the collision risk and the determination of the transmission order will be described with reference to FIGS. 3 to 5.

Figure 3:
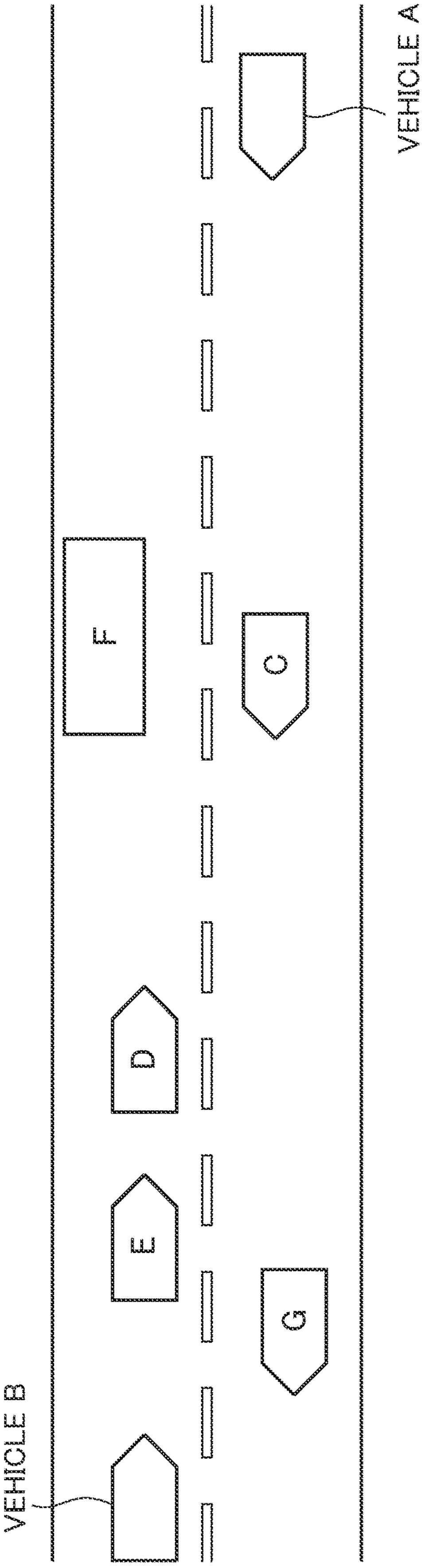
FIG. 3 is a diagram showing an example of a situation in which an object is present in a traveling direction of a vehicle.

The situation shown in FIG. 3 is considered. The vehicle A travels on a lane opposite to the traveling direction of the vehicle B. Objects (preceding vehicles) B and E travel on the same lane as the vehicle B, and an object (an obstacle) F is stopped on the same lane. Objects (oncoming vehicles) C and G, and the vehicle A travel on a lane opposite to the lane of the vehicle B. It is assumed that the sensor of the vehicle A, or the like was able to detect the objects C to G.

The collision risk calculation unit 12 calculates the collision risk based on the relationship between the lane on which the vehicle B travels and the lanes on which the objects C to G are present. In the present embodiment, as shown in FIG. 4, the lanes on which the objects C to G are present are classified into the same lane, an adjacent lane, an opposite lane, an intersecting road, and the lane position uncertainty. The collision risk calculation unit 12 calculates the collision risk based on the lanes on which the objects C to G are present. The same lane means a lane which is the same as the lane on which the vehicle B travels. In an example shown in FIG. 3, the objects D, F, and F are present on the same lane. The adjacent lane is adjacent to the lane on which the vehicle B travels, and a traveling direction of a vehicle on the adjacent lane is the same as the traveling direction of the vehicle B. In the example shown in FIG. 3, there is no adjacent lane. The opposite lane is adjacent to the lane on which the vehicle B travels, and a traveling direction of a vehicle on the opposite lane is opposite to the traveling direction of the vehicle B. In the example shown in FIG. 3, the objects C and G are present on the opposite lane. The same lane, the adjacent lanes, and the opposite lanes are in a road which is the same as a road on which the vehicle B travels.

The intersecting road is a road that intersects the road on which the vehicle B travels. The lane position uncertainty includes, for example, an object that is present outside the road, and an object of unclear position information.

Figure 4:
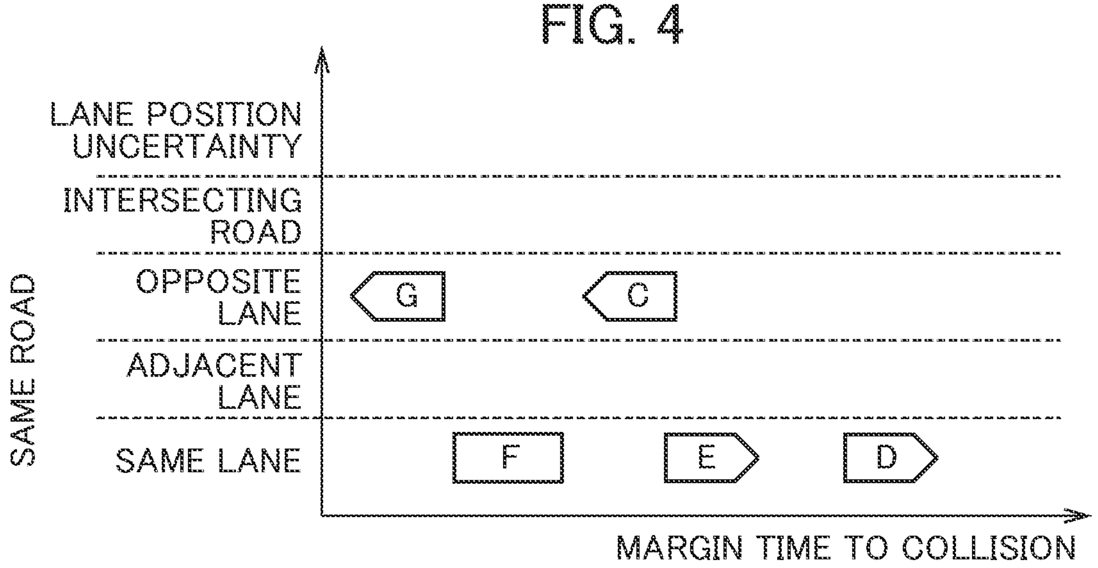
FIG. 4 is a diagram showing an example of an object present on each lane in the situation of FIG. 3.

The collision risk calculation unit 12 sets collision risks in the order of the same lane, the adjacent lane, the opposite lane, the intersecting road, and the lane position in which are listed from the bottom of FIG. 4. In other words, the collision risk calculation unit 12 sets the collision risk of the object present on the same lane to be the highest, and alternatively sets the collision risk of the object whose lane position is uncertain to be the lowest. In the examples shown in FIGS. 3 and 4, the collision risk calculation unit 12 sets the objects D to F present on the same lane to have the highest collision risk, and sets the objects C and G present on the opposite lane to have the next highest collision risk.

The object selection unit 13 transmits the pieces of object information in a descending order of the degree of collision risk, and, in the order of a margin time to the collision from the shortest. Time Headway (THW: headway) is used, for example, for the margin time to the collision on the same lane and the adjacent lane. If the vehicle B travels by following an object, THW may be included in information on the object. For the opposite lane, Time to Collision (TTC: collision time) is used. The object selection unit 13 determines the transmission order of the pieces of object information based on the margin time to the collision, and thus, the vehicle B can process the pieces of object information in the order of the received object information from the first information received to the last information received, when making a plan to take the safety action.

In the example shown in FIG. 4, the order of the length of THWs of the objects D to F present on the same lane are in the order of the object F, the object E, and the object D, and thus, the object selection unit 13 transmits the pieces of object information in the order of the object F, the object E, and the object D. The order of the TTCs of the objects C and G present on the opposite lane are in the order of the object G and the object. C, and thus, the object selection unit 13 transmits the pieces of object information in the order of the object G and the object C.

Figure 5:
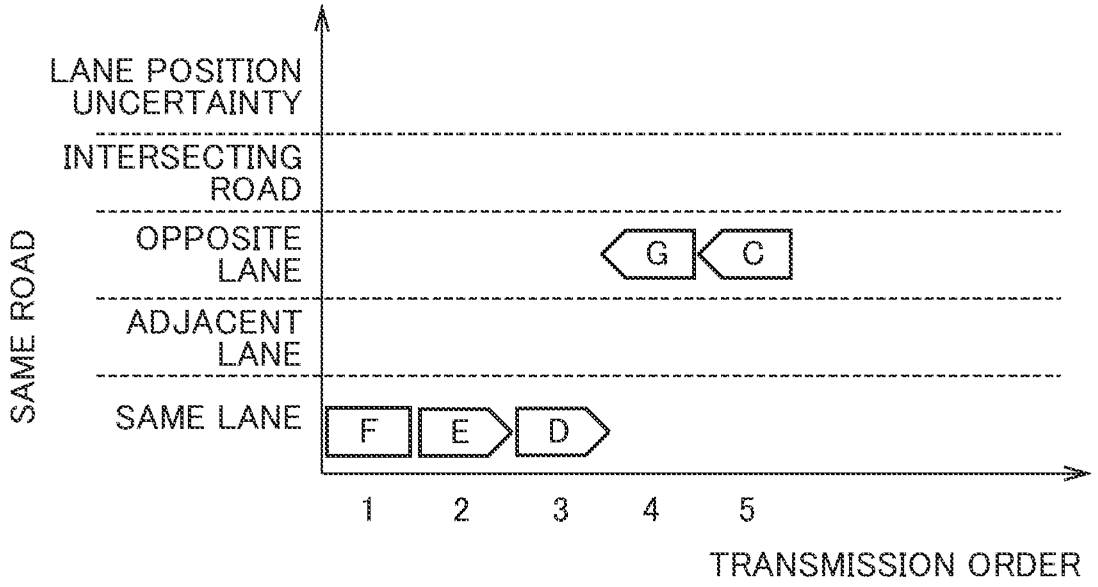
FIG. 5 is a diagram showing a transmission order of pieces of object information transmitted by an information processing device in the situation of FIG. 3.

As shown in FIG. 5, the object selection unit 13 transmits the pieces of object information in the order of the object 7, the object E, the object D, the object G, and the object C. Table 2 shows an example of a data structure of object information transmitted from the information processing device 10 to the vehicle B.

TABLE 2

| | |
|---|---|
| Header | Identification code of information processing device |
| | Index of object information |
| | (1) Identification code of transmission destination vehicle |
| | (2) Geographical area |
| | (3) Flag showing transmission order |
| | (4) Total number of pieces of object information |
| | (5) Total number of pieces of information on objects that have high collision risks |
| | (6) Identification code of object that has high collision risk |
| Content data | Object information |
| | Identification code of object |
| | Information on transmission order of objects |
| | Information on collision risk |
| | Information on device which detects object |
| | (1) Identification code of device |
| | (2) Basic message of device |
| | (3) Sensor information |
| | Detailed information on object |
| | (1) Geographical location of object |
| | (2) Date and time at which object is detected |
| | (3) Traveling direction and speed of object, and position of object on road on which object is present |
| | (4) Stationary duration of object |
| | (5) Type of object |
| | (6) Size of object |
| | (7) Detailed information on road structure |
| | (8) Still image data, video data, and point cloud format data |
| | Object information |
| | : |

The object information in Table 2 is transmitted and configured as one data stream, for example. The data stream includes a header part and a content data part. The header part stores an identification code of an information processing device as a data creation subject, and an index of object information to be transmitted by the content data part. The index of the object information includes an identification code of a transmission destination vehicle (the vehicle B), information showing a geographical area where the object information to be transmitted is collected, a flag showing the transmission order of the pieces of object information, the total number of the pieces of object information included in the content data part, the total number of pieces of information on objects that have high collision risks, and an identification code of an object that has a high collision risk. The geographical area is information for specifying an area. The geographical area is described by a position or a range specified by latitude and longitude, a position or a range specified by a predetermined parameter (a node or a link) of a road map, a position or a range relative to a sensor or the like which detects an object, an area size, a link ID, a group of node IDs for each link, a node ID, node position information (GNSS coordinate), an adjacent area ID, a road ID and a lane ID on the area, a map ID and version information. The flag showing the transmission order is, for example, a flag showing that the transmission order is determined in accordance with the collision risk. Information on an object that has a high collision risk is, for example, object information in which TTC is smaller than a predetermined value. A plurality of identification codes of pieces of information on objects that have high collision risks may be described.

The content data part stores one or more pieces of object information in a descending order of the degree of collision risk with respect to the transmission destination vehicle (the vehicle B). The object information includes an identification code of an object, information on the transmission order of objects, information on the collision risk, information on a device which detects the object, and detailed information on an object.

The information on the transmission order of the objects in the object information of the content data part is, for example, numbers set in accordance with a descending order of the degree of collision risk. The information on the collision risk is information that includes, for example, a collision risk ranking, TTC, THW, and a lane type. The collision risk ranking is a numerical value obtained by ranging the objects detected by the vehicle A, in a descending order of the degree of collision risk with respect to the vehicle B, and assigning a smaller number, as the collision risk becomes high. The lane type is information for identifying a lane on which an object is present, and may be, for example, an identification code of a lane identified on a road map, or may store information indicating that the lane on which a vehicle travels is the same as the lane on which the vehicle B travels, or information indicating that the lane on which a vehicle travels is opposite to the lane on which the vehicle B travels. The information on the object detection is information on a vehicle or a device such as a roadside unit which detects the object. The information on the object detection includes an identification code of a device that detects the object, a basic message of the device, and sensor information. The basic message and the sensor information are similar to the basic message of the vehicle at the time of object detection and the sensor information shown in Table 1. The detailed information on the object is similar to the detailed information on the object shown in Table 1.

The vehicle B that receives the data stream related to the object information having the data structure shown in Table 2 comes to be possible to receive the pieces of object information in a descending order of the degree of collision risk, and accordingly, comes to be possible to process information on an object that has a higher collision risk earlier than when the pieces of object information are received irrespective of the order of the degree of collision risk.

Figure 6:
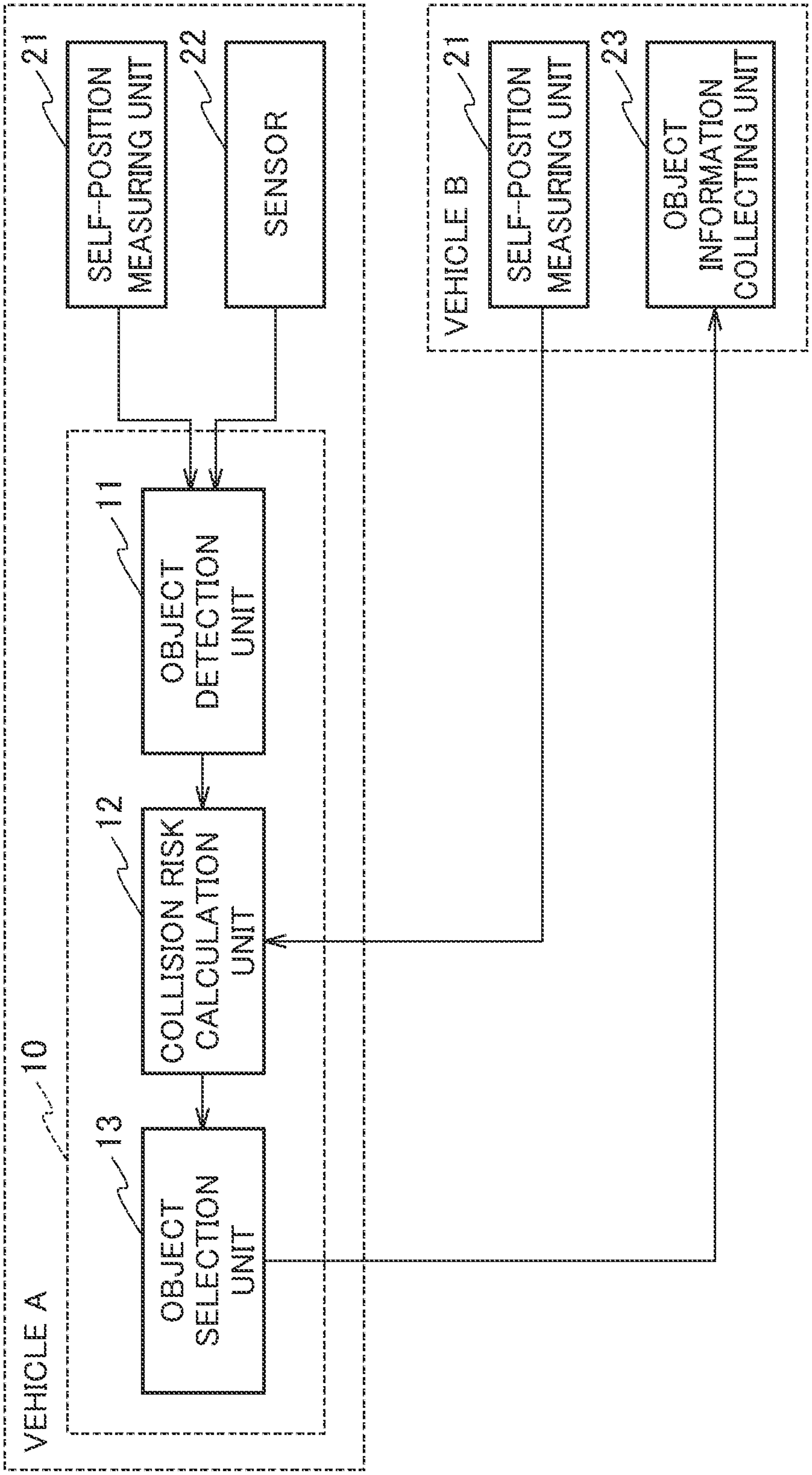
FIG. 6 is a diagram showing a modified example of a first embodiment.
Figure 7:
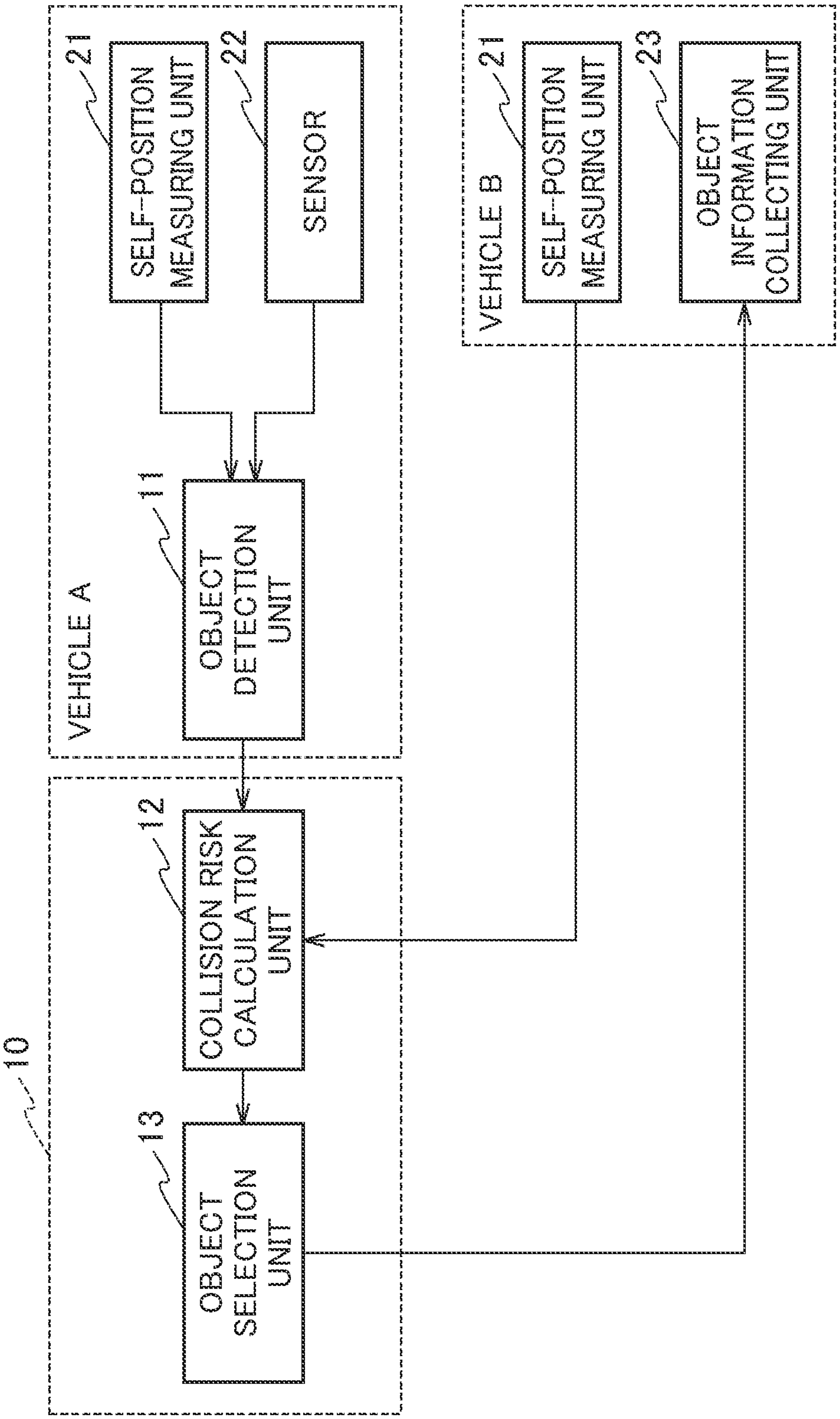
FIG. 7 is a diagram showing a modified example of a first embodiment.

The information processing device 10 may be mounted to the vehicle A as shown in FIG. 6, or partial functions of the information processing device 10 may be mounted to the vehicle A as shown in FIG. 7. In embodiments shown in FIGS. 6 and 7, the vehicle A does not need to transmit the sensor data to the information processing device 10, and thus, the communication volume can be reduced.

As described above, according to the present embodiment, the collision risk calculation unit 12 calculates the collision risk between the vehicle B and each of the objects C to G that are present in the traveling direction of the vehicle B based on the relationship between the lane on which the vehicle B travels and the lanes on which the objects C to G are present. The object selection unit 13 determines the transmission order of pieces of information on the Individual objects C to G based on the collision risk, and transmits the pieces of object information to the vehicle B based on the transmission order. This causes the pieces of object information to be transmitted in the order according to the collision risk, and thus, the vehicle B can make a plan to take safety actions well in advance in the order of the received object information.

Second Embodiment

The information processing device 10 according to a second embodiment will be described with reference to FIG. 8.

Figure 8:
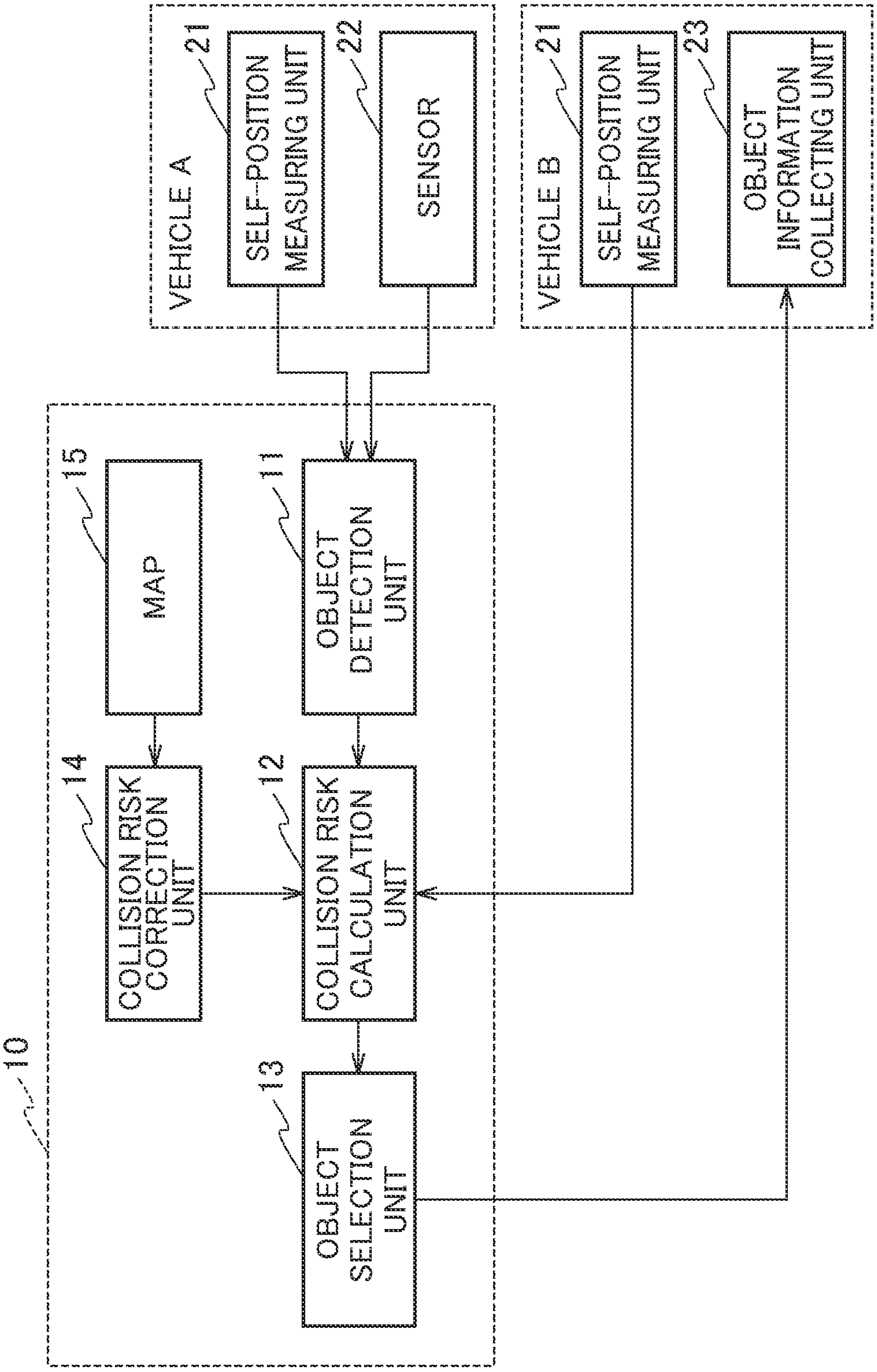
FIG. 8 is an overall configuration diagram including an information processing device according to a second embodiment.

The information processing device 10 shown in FIG. 8 includes a collision risk correction unit 14 and a map 15. Descriptions of configurations overlapping with those in the first embodiment will be omitted.

The collision risk correction unit 14 corrects the collision risk depending on a condition of an object, that is, an environmental factor surrounding the object. When correcting the collision risk, the collision risk correction unit 14 may refer to the map 15, and correct the collision risk based on whether a median strip is present, a condition of a road such as a priority road, and traffic rules. Examples of conditions of correcting the collision risk are shown below. The collision risk is set to be high, if an object (a pedestrian) stopping at a place outside a road is about to start. The collision risk is set to be high, if an object (an oncoming vehicle) which is stopped to wait for a right turn is about to start. The collision risk is set to be high for an object (an intersecting vehicle) that is present on an intersecting road which has a priority over the road on which the vehicle B travels. The collision risk is set to be low, if the median strip is present between the lane on which the vehicle B travels and the travelling lane of the object (the oncoming vehicle).

As on the map 15, map information acquired via the network may be used, or if the information processing device 10 is mounted to the vehicle A, a map in the vehicle A may be used.

Figure 9:
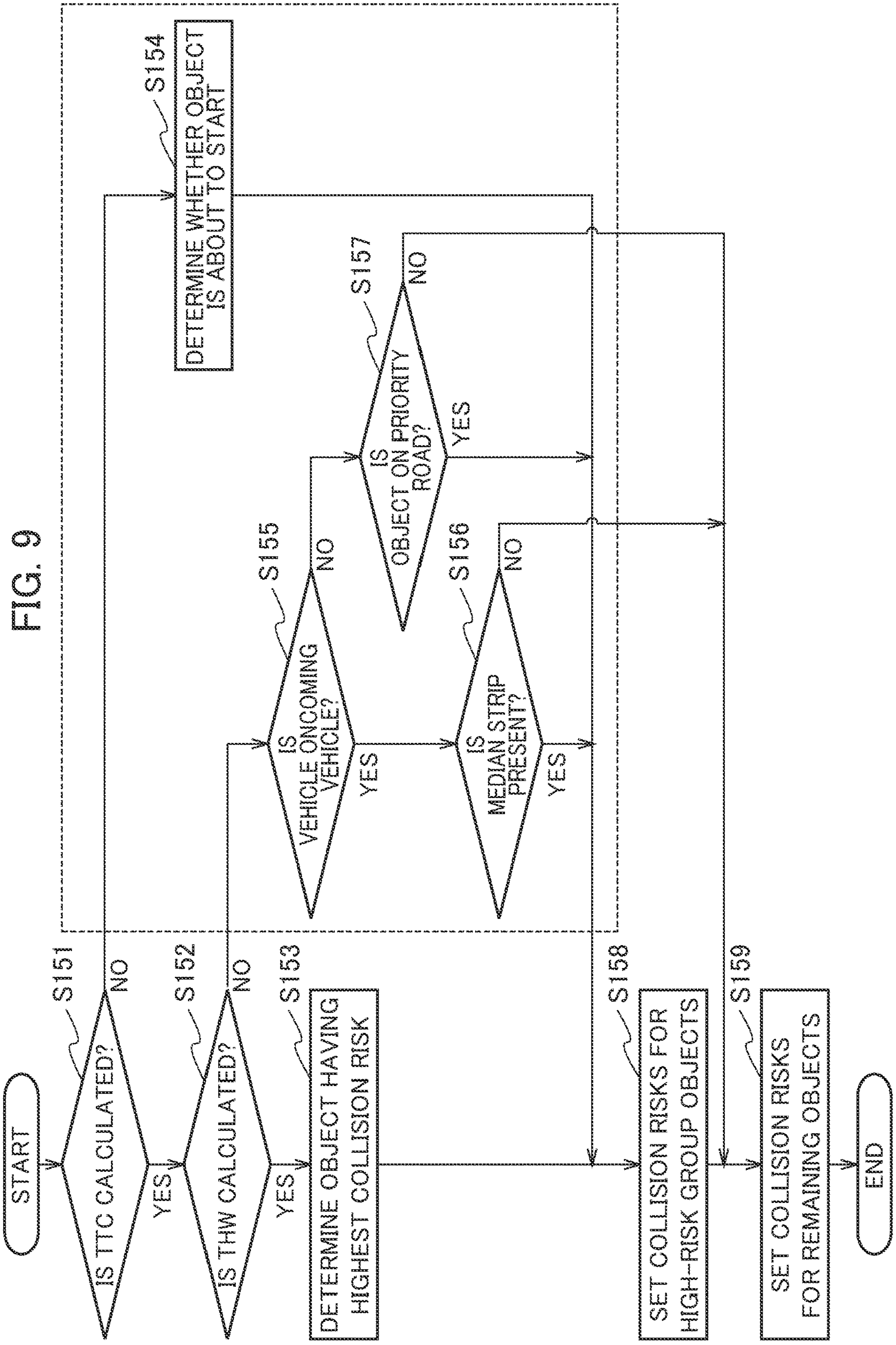
FIG. 9 is a flowchart showing flows of processes of correcting collision risks.
Figure 10:
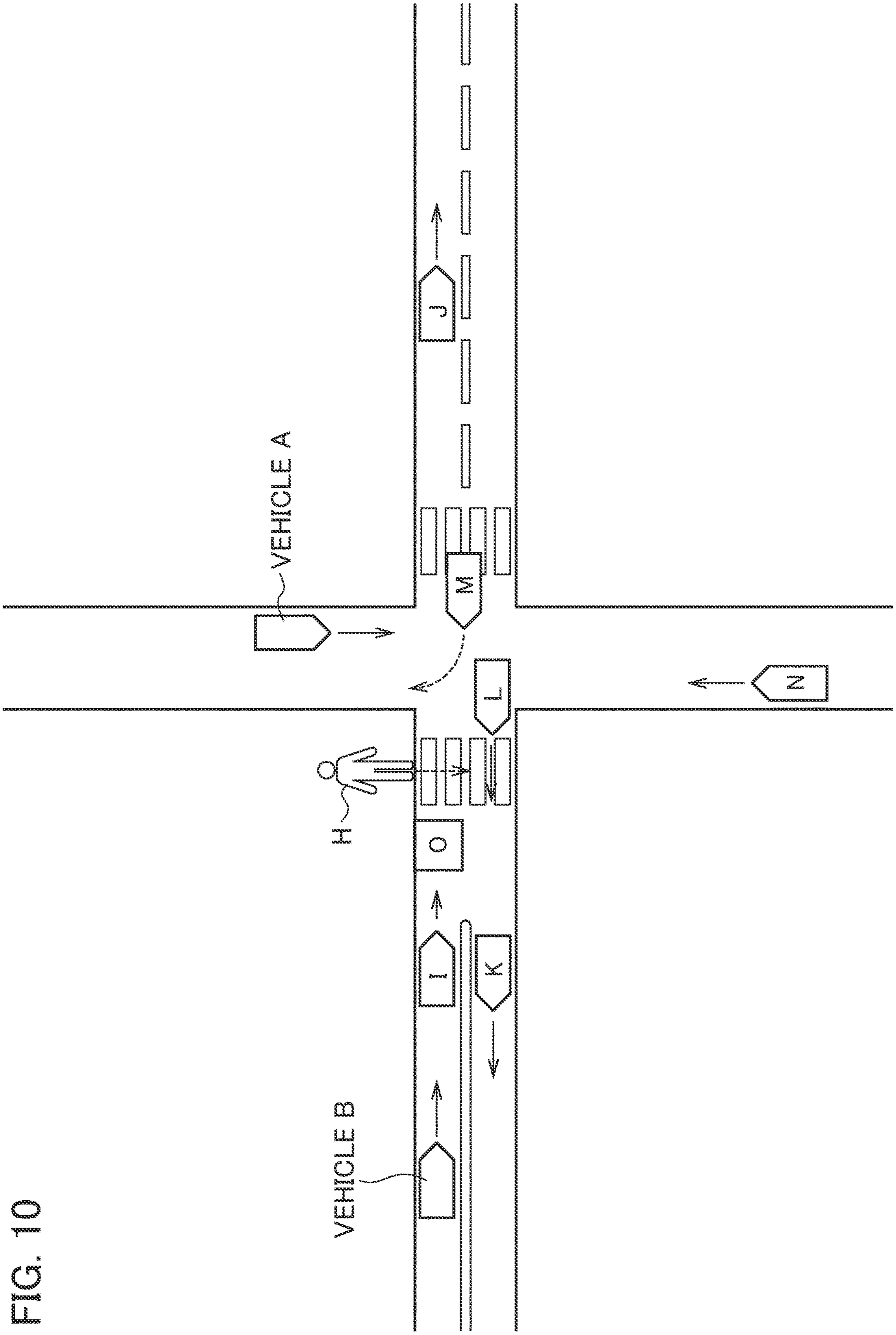
FIG. 10 is a diagram showing an example of an object that can be detected by a sensor of a vehicle and a condition of each object.

With reference to FIGS. 9 to 11, flows of processes of correcting the collision risk will be described. The processes shown in a flowchart of FIG. 9 are performed after a process of step S15 in FIG. 2. The collision risk calculation unit. 12 performs the processes of FIG. 9 for each object.

The flowchart of FIG. 9 will be described with reference to an example shown in FIG. 10. FIG. 10 shows objects H to O detected by the sensor in the vehicle A. An object (a crossing pedestrian) H is about to cross the road on which the vehicle B travels. Objects (preceding vehicles) I and J travel on a lane which is the same as the lane on which the vehicle B travels, and an object (an obstacle) O is stopped also on the same lane. Objects (oncoming vehicles) K and L travel on an opposite lane of the vehicle B. An object (an oncoming vehicle) M is about to make a right turn from the opposite lane of the vehicle B. An object (an intersecting vehicle) N travels on an intersecting road that intersects the road on which the vehicle B travels. The median strip is present between the lane on which the vehicle B travels and the travelling lane of the oncoming vehicle K. The road on which the intersecting vehicle N travels is not a priority road over the road on which the vehicle B travel. Regarding the example of FIG. 10, items of the median strip and the priority road of FIG. 11 show whether the median strip is present and whether an object road is a priority road.

In step S151, the collision risk calculation unit 12 calculates the TTC based on the distance and a relative speed between the vehicle B and the object, and determines whether the TTC between the vehicle B and the object can be calculated. An object whose ITC is not able to be calculated is a stationary object. If the TTC is not able to be calculated, the collision risk correction unit 14 advances a process to step S154.

The calculation results of the TTC in the example of FIG. 10 are shown in items of the TTC in FIG. 11. In the example of FIG. 10, the crossing pedestrian H and the oncoming vehicle N are stationary, and thus, the TTC is not able to be calculated. The intersecting vehicle N travels on a road which is different from the road on which the vehicle B travels, and thus, the TTC is not calculated either.

If the TTC can be calculated, in step S152, time collision risk calculation unit 12 calculates the THW of an object followed by the vehicle B, and if the THW is not calculated, a process is advanced to step S155. The object that is not followed by the vehicle B is an oncoming vehicle that travels on an opposite lane, or an intersecting vehicle that travels on an intersecting road.

In the example of FIG. 10, the THWs of the preceding vehicles I and J, and the obstacle O are calculated. The calculation results of the THW are shown in items of the THW in FIG. 11.

After calculating the THW, in step S153, the collision risk calculation unit 12 sets the highest collision risk to an object having the shortest ITC and the shortest THW among the objects followed by the vehicle B.

In the example shown in FIG. 10, both of the TTC and the THW of the preceding vehicle I and the obstacle O are the shortest, and thus, the collision risk of the preceding vehicle I and the obstacle O is set to "1". As the risk that an object collides with the vehicle B increases, a numerical value of the collision risk is set to be smaller. The collision risk calculation unit 12 does not set the collision risk of the preceding vehicle J in step S153.

In steps S154 to S157, the collision risk correction unit 14 determines a collision environment risk depending on a condition of each object. The collision environment risk is information for correcting the collision risk depending on the condition of the object. In the present embodiment, any one of "high," "normal," and "no risk" is set for the collision environment risk.

In step S154, the collision risk correction unit 14 detects whether a starting action is made by a stationary object, and if the starting action is made by the object, the collision risk correction unit 14 determines that the collision environment risk of the object is high.

In the example shown in FIG. 10, the crossing pedestrian H and the oncoming vehicle K are about to start, and thus, the collision environment risks of the objects are determined to be high. The determination results of the collision environment risk are shown in items of the collision environment risk in FIG. 11.

In step S155, the collision risk correction unit 14 determines whether an object is an oncoming vehicle.

If the object is the oncoming vehicle, in step S156, the collision risk correction unit 14 determines whether the median strip is present between the lane on which the vehicle B travels and a lane on which the object travels. If the median strip is present, the object is determined to have no collision environment risk, and alternatively, if the median strip is absent, the object is determined to have a high collision environment risk.

In the example shown in FIG. 10, the oncoming vehicle L travels on the opposite lane without the median strip, and thus, the object is determined to have a high collision environment risk. Alternatively, the oncoming vehicle K travels on the opposite lane with the median strip, and thus, the object is determined to have no collision environment risk.

If the object is an intersecting vehicle, in step S157, the collision risk correction unit 14 determines whether a road on which the intersecting vehicle travels is a priority road over the road on which the vehicle B travels. If the road of the object is not a priority road, the object is determined to have a normal collision environment risk, and alternatively, if the road of the object is a priority road, the object is determined to have a high collision environment risk.

In the example shown in FIG. 10, a road on which the intersecting vehicle N travels is not a priority road over the road on which the vehicle B travels, and thus, the object is determined to have a normal collision environment risk.

After the collision environment risk is determined, in step S158, the collision risk calculation unit 12 sets the collision risk in the order of TTC and in the order of distance for the objects which are determined to have a high collision environment risk in the processes of steps S154 to S157.

In the example shown in FIG. 10, as shown in FIG. 11, the collision environment risks of the crossing pedestrian H, the oncoming vehicle L, and the oncoming vehicle M are determined to be high. The collision risk calculation unit 12 sets "2" for the collision risk of the oncoming vehicle L having the shortest ITC among the objects having the high collision environment risk, sets "3" for the collision risk of the crossing pedestrian H having a close distance from the vehicle B, and sets "4" for the collision risk of the oncoming vehicle M.

In step S159, the collision risk calculation unit 12 sets the collision risks for the remaining objects. For the objects having the normal collision environment risk, the collision risk calculation unit 12 sets the collision risk in the order based on the positional relationship between the lane on which the vehicle B travels and the lane on which the objects are present, as in the first embodiment.

In the example shown in FIG. 10, the collision risks of the preceding vehicle J, the oncoming vehicle K, and the intersecting vehicle N are set. The preceding vehicle J and the intersecting vehicle N have normal collision environment risks, and the oncoming vehicle K has no collision environment risk. The collision risk calculation unit 12 sets "5" for the collision risk of the preceding vehicle J that travels on a lane which is the same the lane on which the vehicle B travels, and sets "6" for the collision risk of the intersecting vehicle N that travels on the intersecting road.

The collision risk calculation unit 12 sets "7" for the collision risk of the oncoming vehicle K having no collision environment risk.

By performing the above described processes, the collision risk is set for each object. Thereafter, the object selection unit 13 transmits the pieces of object information to the vehicle B in the order from an object having a high collision risk.

As described above, according to the present embodiment, the collision risk correction unit 14 sets the collision environment risk depending on the conditions of the objects H to O, and corrects the collision risk according to the collision environment risk. As a result, for environmental factors in which the TTC and THW are not calculated, the transmission order of the pieces of information on the objects H to O is corrected based on, for example, displaying of a direction indicator of the oncoming vehicle N and whether the oncoming vehicle N makes a starting action, whether the crossing pedestrian H makes a starting action, and traffic rules such as priority roads, and accordingly, the vehicle B can quickly respond to situations depending on the conditions of the objects H to O.

Third Embodiment

Figure 12:
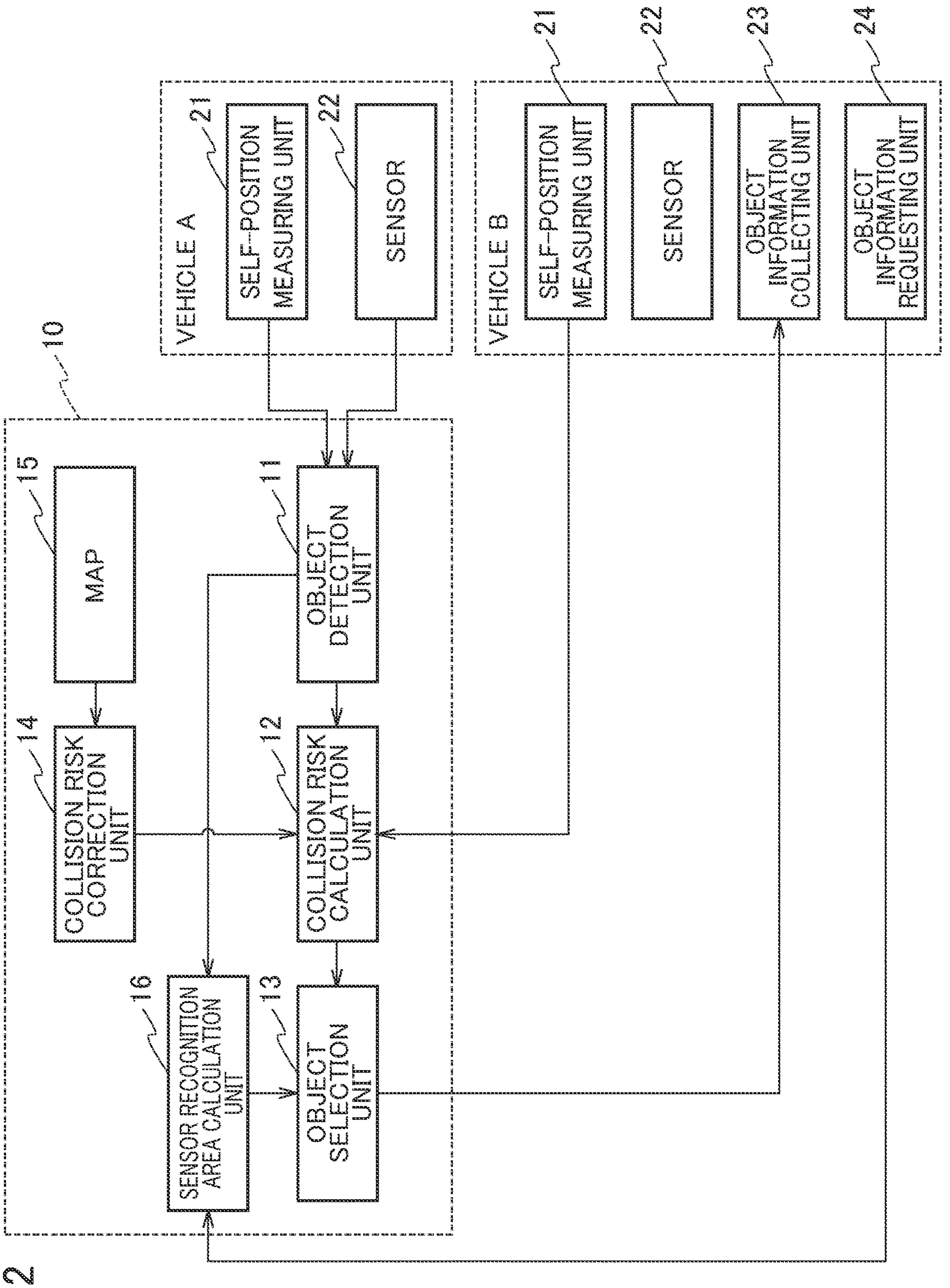
FIG. 12 is an overall configuration diagram including an information processing device according to a third embodiment.

With reference to FIG. 12, the information processing device 10 according to a third embodiment will be described.

The information processing device 10 shown in FIG. 12 includes a sensor recognition area calculation unit 16. Further, the vehicle B includes a sensor 22 and an object information requesting unit 24. Descriptions for constitutions overlapping with those in the first and second embodiments are omitted. The information processing device 10 according to the third embodiment may not include the collision risk correction unit 14 and the map 15. In other words, the information processing device 10 according to the first embodiment may be the one obtained by adding the sensor recognition area calculation unit 16 to the information processing device 10 according to the first embodiment.

The information processing device 10 receives, from the vehicle B, a transmission request for requesting the transmission of the object information, and starts transmitting the object information to the vehicle B in response to the transmission request. The transmission request may include information on a distribution range in which the vehicle B desires that the object information is transmitted. In the first and second embodiments also, the transmission of the object information to the vehicle B may be started in response to the reception of the transmission request. An example of the data structure of the transmission request transmitted from the vehicle B is shown in Table 3 below.

TABLE 3

| | |
|---|---|
| Header | Information on vehicle<br>(1) Identification code of vehicle<br>(2) Basic message of vehicle<br>Request information<br>(1) Flag indicating request content<br>(2) Identification code of request<br>(3) Type of requested object<br>(4) Time limit<br>(5) Maximum data size<br>(6) Type of data |

TABLE 3-continued

| | |
|---|---|
| Content data | Request area information<br>Identification code of request area<br>Request area data<br>Request area information<br>: |

The transmission request in Table 3 is, for example, configured and transmitted as one data stream. The data stream includes a header part and a content data part. The header part stores information on the vehicle that transmits the request, and request information. The information on the vehicle includes an identification code of the vehicle and a basic message of the vehicle. The basic message contains content which is similar to that of the basic message of Table 1.

The request information includes a flat indicating the request content, an identification code of the request, a type of the requested object, a time limit, a maximum data size, and a data type. The flag indicating the request content is a flag indicating that the transmission of the object information is requested. The type of the requested object is, for example, a vehicle, a pedestrian, a bicycle, or an obstacle, and is expressed by an identification code indicating the type. The time limit is a time limit for receiving the object information and is expressed by a date and a time. The maximum data size indicates magnitude of the receivable data size. The data type indicates a type of receivable data such as, for example, text data, still image data, or video data. The data type may include a file type such as MPEG or AVI.

The content data part stores one or more pieces of request area information. The request area information includes an identification code of a request area, and request area data. The request area data is information for specifying an area where the transmission of the object information is requested. The request area data is described by a position or a range specified by latitude and longitude, a position or a range specified by a predetermined parameter (a node or a link) of a road map, a position or a range relative to a sensor or the like which detects an object, an area size, a link ID, a group of node IDs for each link, a node ID, node position information (GNSS coordinate), an adjacent area ID, a road ID and a lane ID on the area, a map ID and version information.

The sensor recognition area calculation unit 16 receives, from the vehicle A, information on a sensing range of the sensor 22 of the vehicle A to specify a range of an object detected by the vehicle A, and transmits the detection range to the vehicle B. The information processing device 10 transmits, to the vehicle B, information on the object which is detected within the distribution range and the detection range.

The vehicle B has the sensor 22 as the vehicle A to sense the space around the vehicle B. The object information requesting unit 24 may transmit, to the information processing device 10, the transmission request in which a blind spot area that is not able to be sensed by the vehicle B by using the sensor 22 is set as the distribution range. The information processing device 10 transmits the object information to the vehicle B in response to the transmission request. The vehicle B integrates sensing results obtained by using the sensor 22 of the vehicle B, and the object information received from the information processing device 10 to perform processes such as planning to take a safety action.

Figure 13:
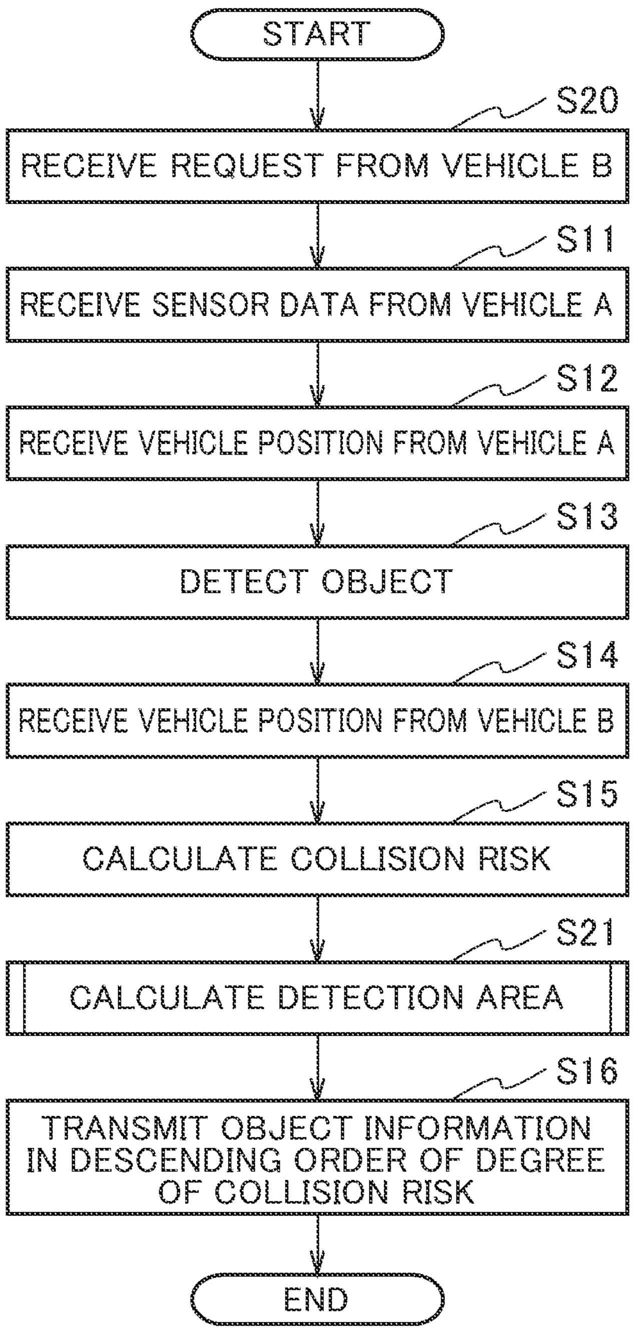
FIG. 13 is a flowchart showing flows or processes performed by an information processing device according to a third embodiment.

With reference to FIG. 13, flows of processes of the information processing device 10 according to the third embodiment will be described. A flowchart of FIG. 13 is the one obtained by adding, to the flowchart of in. 2, a process of receiving the transmission request in step S20 and a process of calculating the detection range in step S21.

Figure 14:
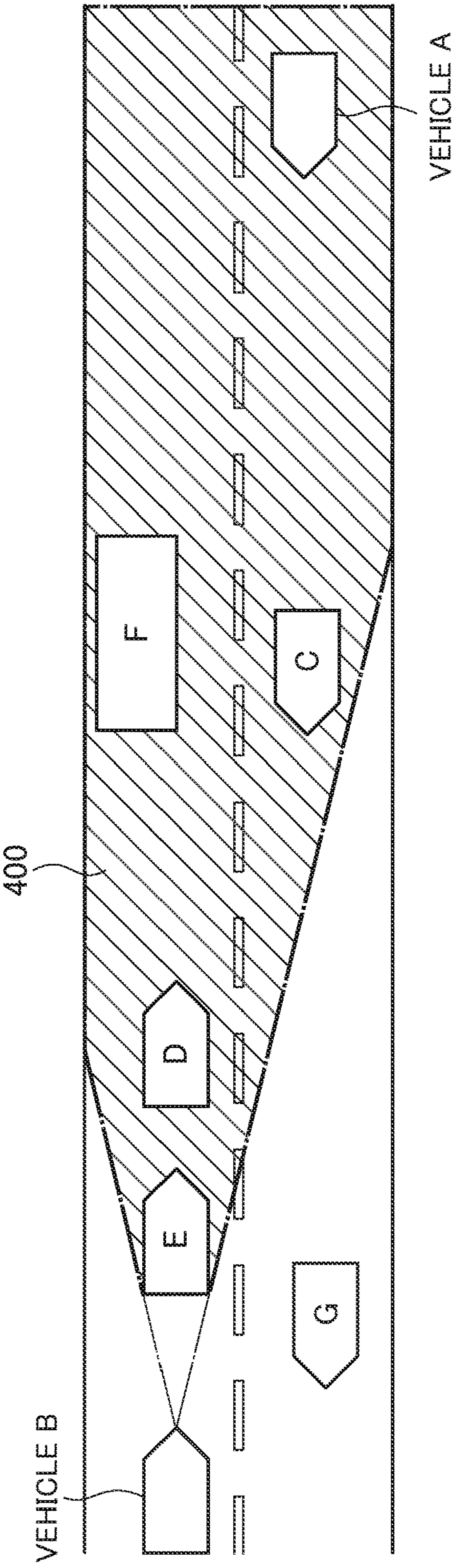
FIG. 14 is a diagram showing an example of a distribution range.

In step S20, the information processing device 10 receives, from the vehicle B, the transmission request including the distribution range. FIG. 14 shows an example of the distribution range. A distribution range 400 in FIG. 14 is an area on a road in the traveling direction of the vehicle B, which becomes the blind spot area of the sensor 22 of the vehicle B due to the preceding vehicle F.

The vehicle B may cause a travel route plan to be included in the transmission request. The travel route plan indicates a route along which the vehicle B will travel in the future, and means, for example, a route to a destination which is set in advance. The information processing device 10 may set the route along which the vehicle B is planned to travel as the distribution range based on the travel route plan, and may perform the processes at or after step S11 to transmit the object information. For example, if the vehicle B is planned to make a left turn at an intersection, the information processing device 10 sets an intersecting road that will appear in front of the vehicle B after the vehicle B makes a left turn at the intersection as the distribution range, and performs the processes at or after step S11.

In steps S11 and S12, the object detection unit 11 receives, from the vehicle A, the sensor data, the position information, and a range sensed by the sensor 22.

In step S13, the object detection unit 11 detects objects present around the vehicle A based on the sensor data and the position information on the vehicle A, and outputs pieces of information on the objects to the collision risk calculation unit 12.

In step S14, the collision risk calculation unit 12 receives the position information on the vehicle B. Processes of receiving signals in steps S11, S12, and S14 may be performed at any time in a random order.

In step S15, the collision risk calculation unit 12 calculates a risk that the vehicle B collides with each object based on the position information on the vehicle B and the object information. The information processing device 10 may perform the process of correcting the collision risk according to the second embodiment.

In step S21, the sensor recognition area calculation unit 16 calculates the detection range of the object based on the distribution range and a range sensed by the sensor 22 in the vehicle A. The details of processes performed by the sensor recognition area calculation unit 16 will be described later.

In step S16, the object selection unit 13 transmits the detection range calculated in step S21, and transmits the pieces of object information to the vehicle B in the order from the object having the highest collision risk.

Figure 15:
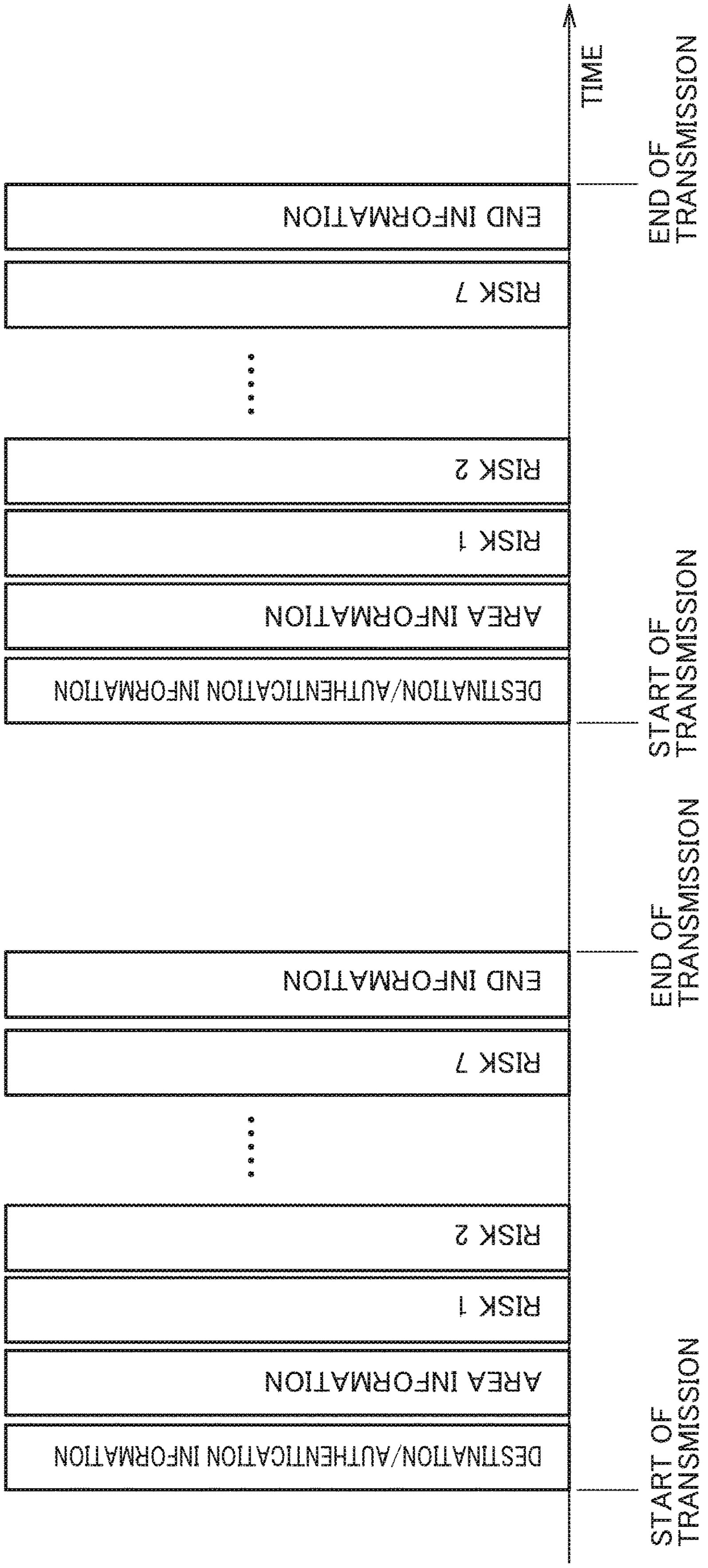
FIG. 15 is a diagram showing an example a transmission order of pieces of data.

FIG. 15 shows an example of the order of data transmission by the information processing device 10. The information processing device 10 transmits data including authentication information to the vehicle B as a transmission destination. After a communication path is established between the information processing device 10 and the vehicle B, the information processing device 10 transmits the detection range obtained in step S21 to the vehicle. Thereafter, the information processing device 10 transmits the pieces of object information in the order of the collision risks obtained in step S15 to the vehicle. The information processing device 10 notifies the vehicle B that the transmission of the data is completed to end the transmission.

Figure 16:
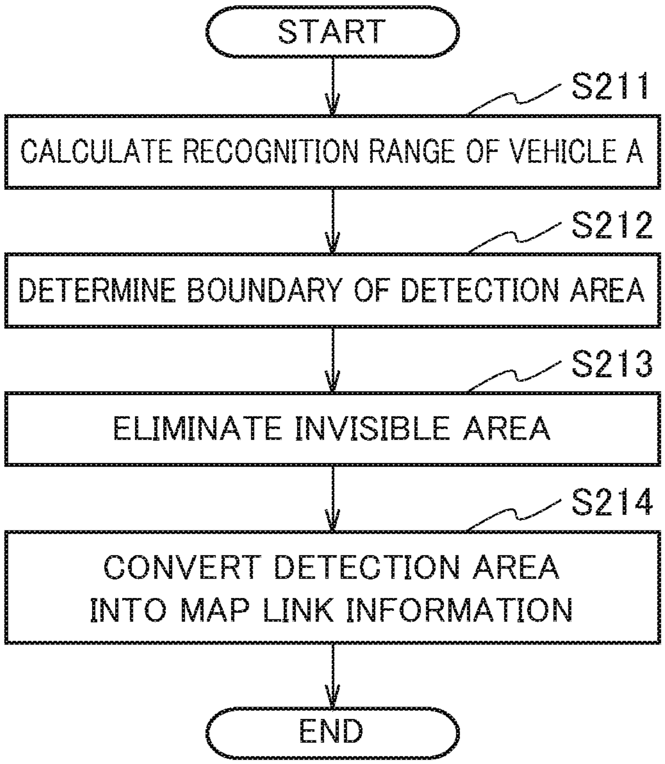
FIG. 16 is a flowchart showing flows of processes of calculating a detection range.

With reference to FIGS. 16 to 20, flows of processes of calculating a detection range will be described. Processes shown in a flowchart of FIG. 16 are performed by the sensor recognition area calculation unit 16.

Figure 17:
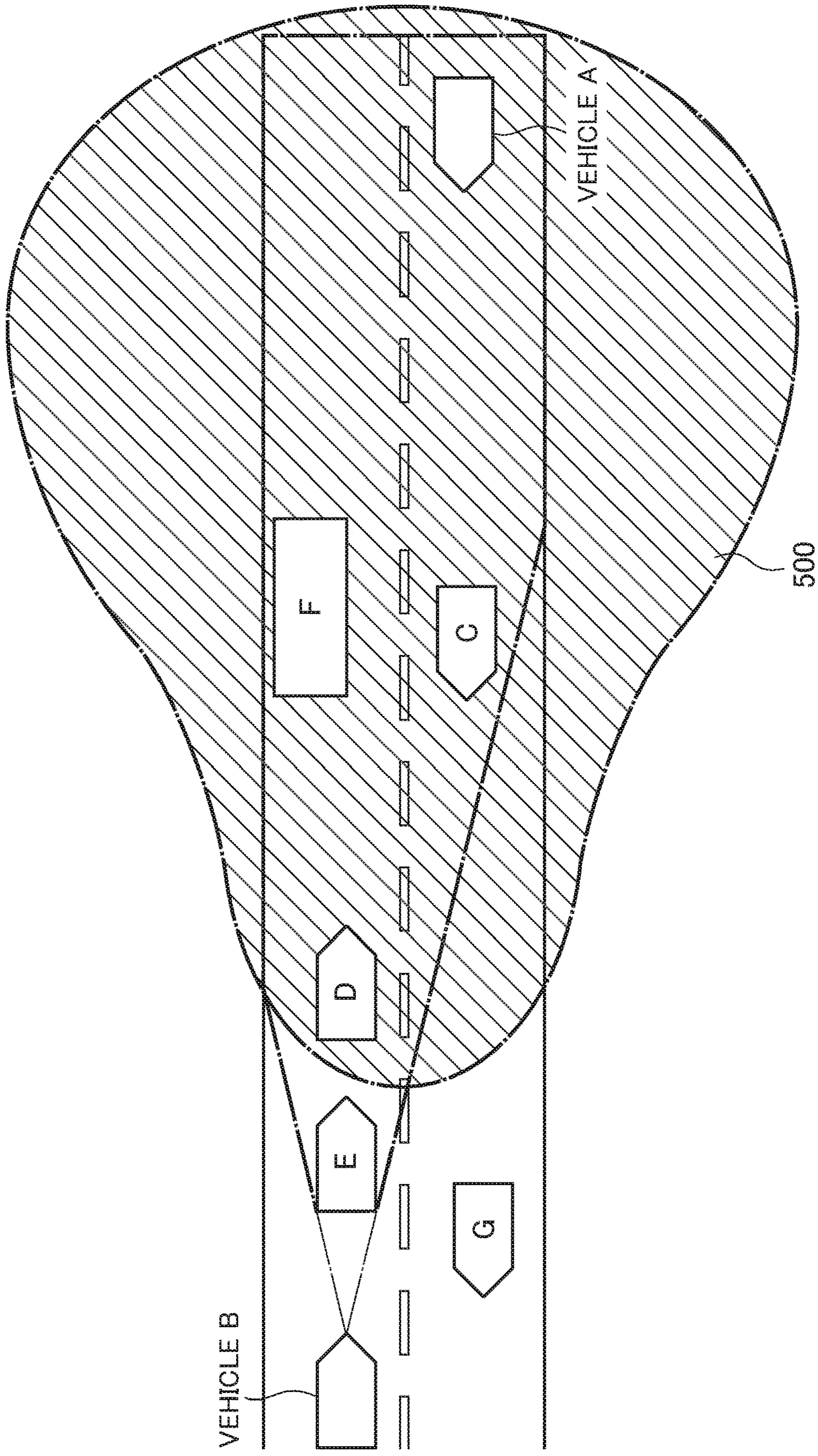
FIG. 17 is a diagram showing an example of a recognition range of a sensor.

In step S211, the sensor recognition area calculation unit 16 calculates a recognition range of the vehicle A from a position and an attitude of the vehicle A, and the sensing range of the sensor 22 of the vehicle A. FIG. 17 shows an example of a recognition range 500 of the vehicle A. In an example of FIG. 17, the recognition range 500 of the vehicle A, covers a range up to a far position from the vehicle A in front of the vehicle A.

Figure 18:
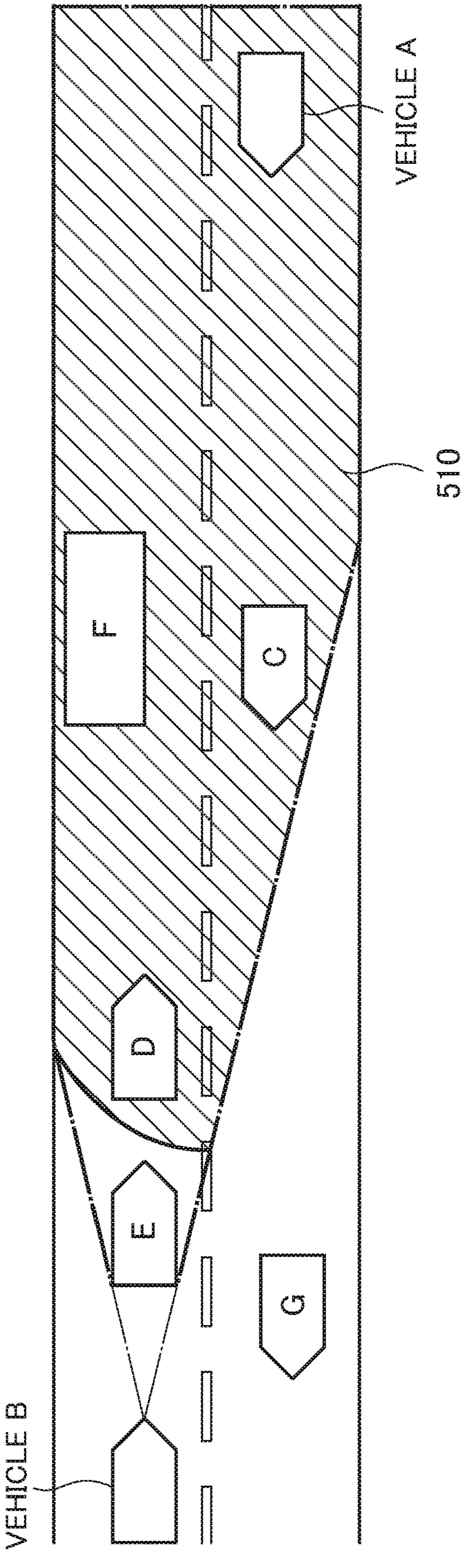
FIG. 18 is a diagram showing an example of a detection range.

In step S212, the sensor recognition area calculation unit 16 determines the detection range based on the recognition range, the distribution range desired by the vehicle B, and boundary lines of a road. Specifically, the sensor recognition area calculation unit 16 sets an area inside the boundary lines of the road that satisfies the recognition range and the distribution range as the detection range. FIG. 18 shows an example of a detection range 510. The detection range 510 is determined based on the boundary lines of the road and is determined within the distribution range.

Figure 19:
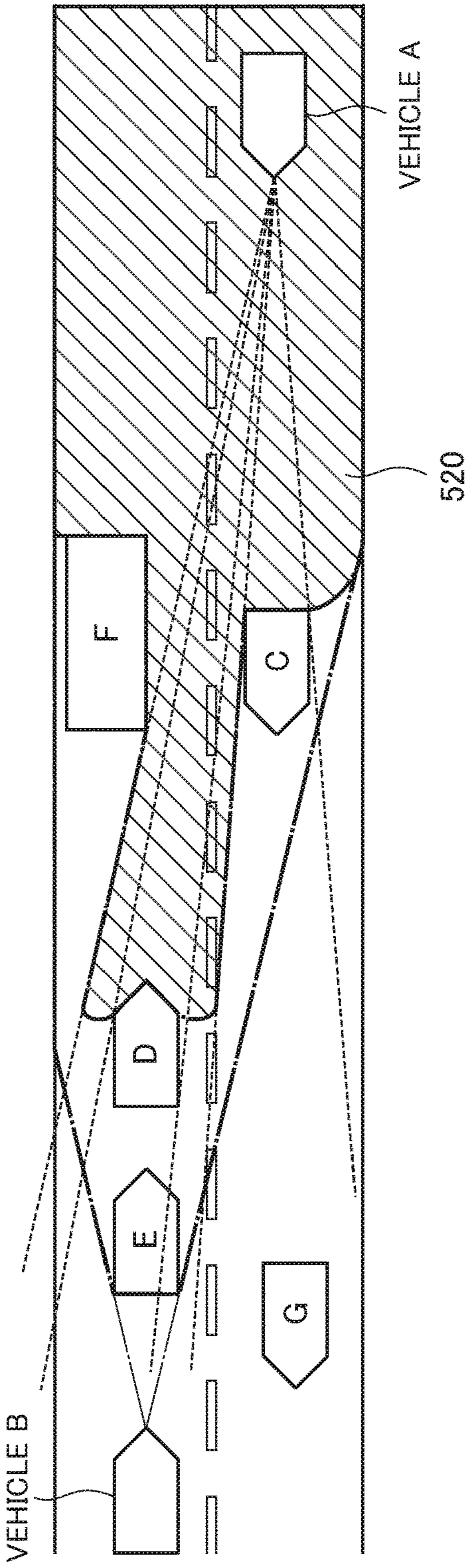
FIG. 19 is a diagram showing an example of a detection range from which a shielded area is excluded.

In step S213, the sensor recognition area calculation unit 16 excludes, from the detection range. 510, an area that may not be visible (sensed) by the vehicle A (hereinafter referred to as "shielded area"). FIG. 19 shows an example of a detection range 520 obtained by excluding the invisible area from the detection range. In an example of FIG. 19, the sensor recognition area calculation unit 16 obtains a parting line that connects the vehicle A with each of end points of the objects C, D, and F, estimates a shielded area that is not able to be sensed by the sensor 22 of the vehicle A, and obtains the detection range 520 which is obtained by excluding the shielded area from the detection range 510.

Information on an object that is present outside the detection range 520 is not transmitted. In an example of FIG. 19, the object E and the object G are present outside the detection range 520. The sensor 22 of the vehicle A is not able to detect the object E and the object G, and thus, the information processing device 10 does not transmit, to the vehicle B, the pieces of information on the object F and the object G.

Figure 20:
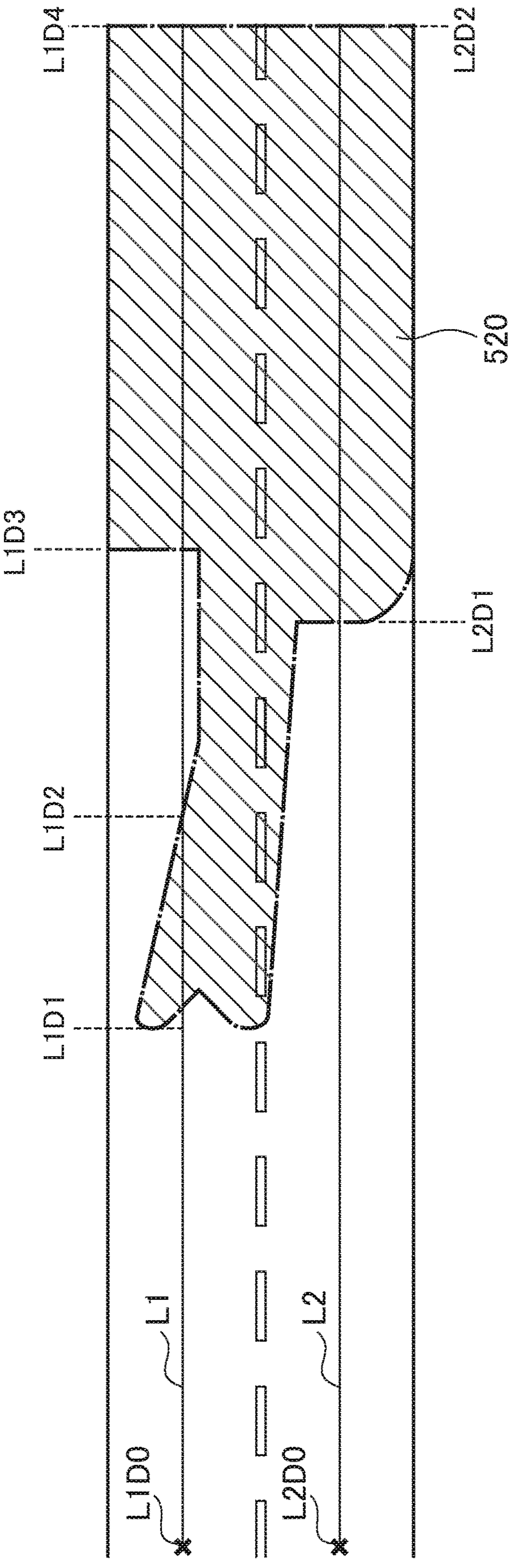
FIG. 20 is a diagram showing an example in which a detection range is set based on a link represented by a connection be nodes.

In step S214, the sensor recognition area calculation unit 16 represents the detection range 520 based on a link represented by a connection between nodes of the road or the lane. FIG. 20 shows an example in which the detection range 520 is set based on the ink represented by the connection between the nodes. An example of FIG. 20 shows a lane link L1 where the vehicle B travels and a lane link L2 where the vehicle A travels. The sensor recognition area calculation unit 16 expresses the detection range 520 by a distance from a reference point L1D0 of the lane link L1 and a distance from a reference point L2D0 of the lane link L2. Specifically, the detection range 520 is expressed as a range between a point L1D1 and a point L1D2 on the lane link L1, a range between a point L1D3 and a point L1D4 on the lane link L1, and a range between a point L2D1 and a point L2D2 on the lane link L2.

By performing the above described processes, the detection range 520 by the vehicle A is calculated.

With reference to FIGS. 21 to 24, variations of the shielded area to be excluded from the detection range will be described.

Figure 21:
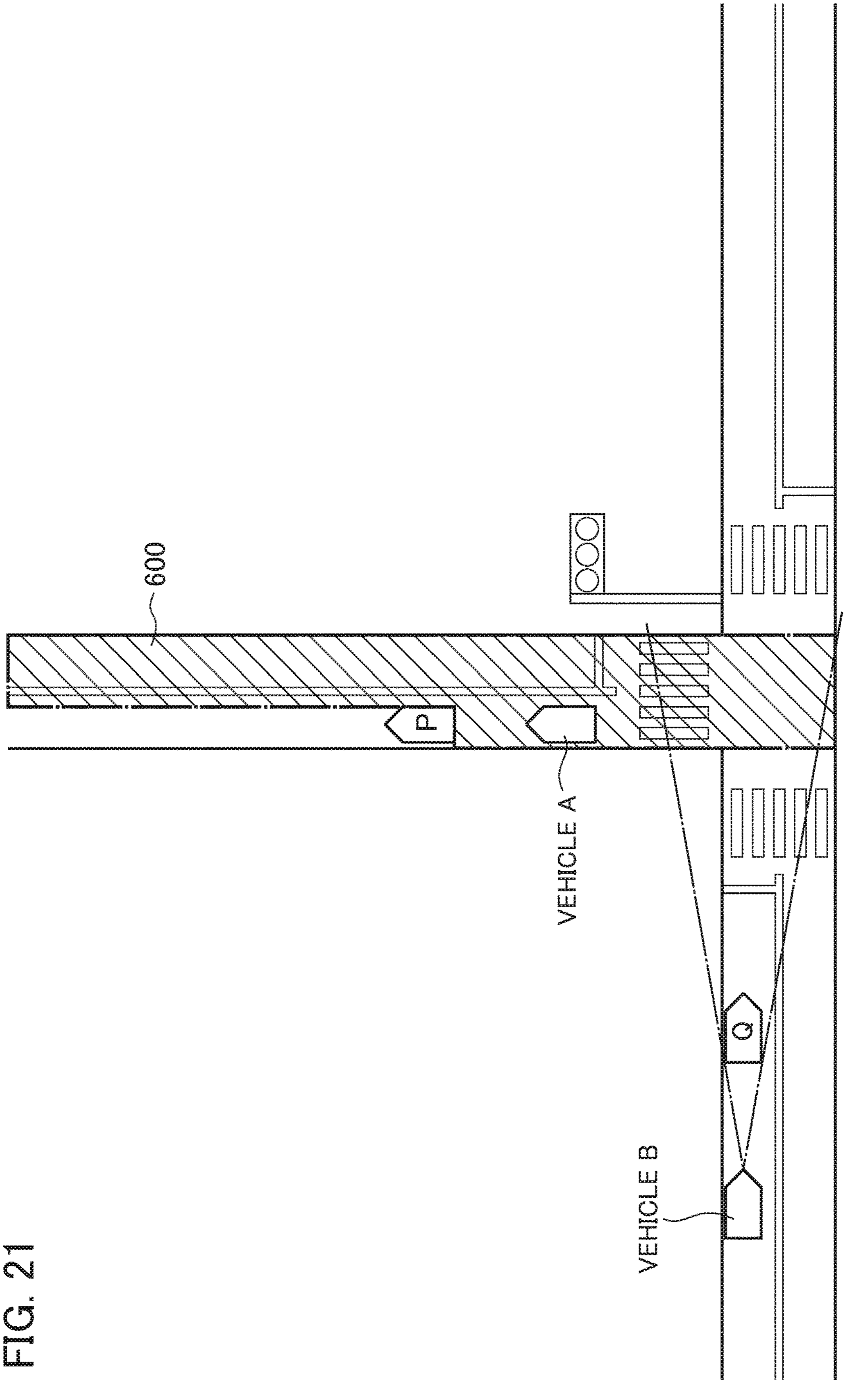
FIG. 21 is a diagram showing an example of a shielded area.

As shown in FIG. 21, if the object P is present in front of the vehicle A, a shielded area occurs. The vehicle A travels on an intersecting road that intersects the road on which the vehicle B travels. The vehicle B transmits a transmission request to the information processing device 10 by setting an area which is invisible due to the presence of the object Q as the distribution range. In the traveling direction of the vehicle B, there are a straight road which extends straight through the intersection, and an intersecting road that intersects at the intersection. In this case, the information processing device 10 may set both of the straight road and the intersecting road as distribution ranges, and transmit pieces of information on objects present in both of the distribution ranges. The object P is present in front of the vehicle A that travels on the intersecting road, and the shielded area occurs due to the presence of the object P. The information processing device 10 sets an area in front of the object P as the shielded area, and sets an area obtained by excluding the shielded area from the intersecting road as a detection range 600.

Figure 22:
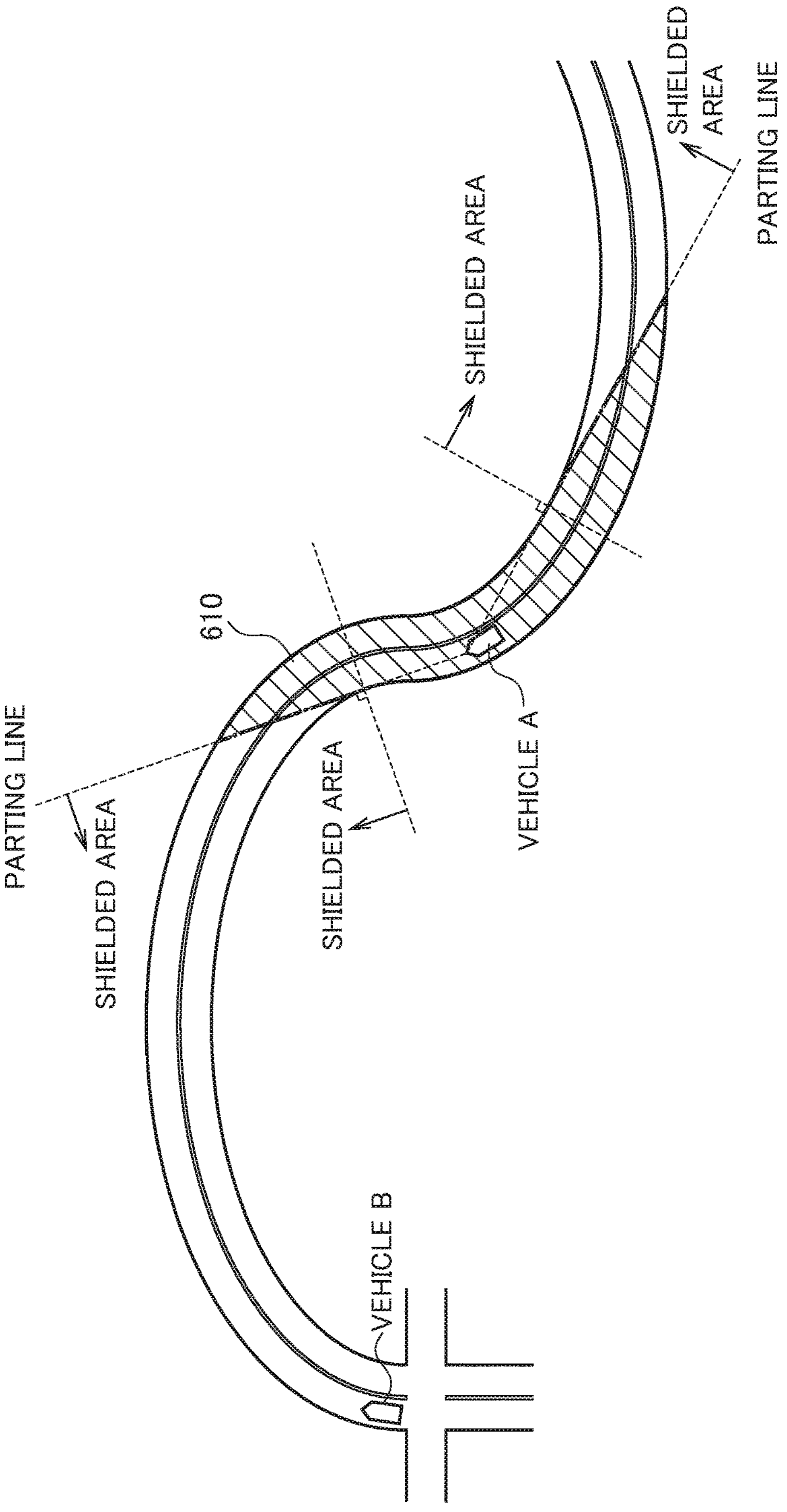
FIG. 22 is a diagram showing an example of a shielded area.

As shown in FIG. 22, when the vehicle A travels on a curved road, a shielded area occurs according to the curvature of a curve. The road on which the vehicle A travels is a road in a mountain are, and it is assumed that a range beyond the curve is invisible. In an example shown in FIG. 22, the sensor recognition area calculation unit 16 acquires, from the map 15, information on the curved road on which the vehicle A travels, and sets a parting line that extends from the vehicle A to contact a road boundary line, and a line that is perpendicular to the parting line. The sensor recognition area calculation unit 16 excludes an area partitioned by these lines from a detection range 610 as the shielded area in an example shown in FIG. 22, the vehicle A travels on an S-curve road, and thus, both of a shielded area in front of the vehicle A and a shielded area behind the vehicle A are excluded from the detection range 610.

Figure 23:
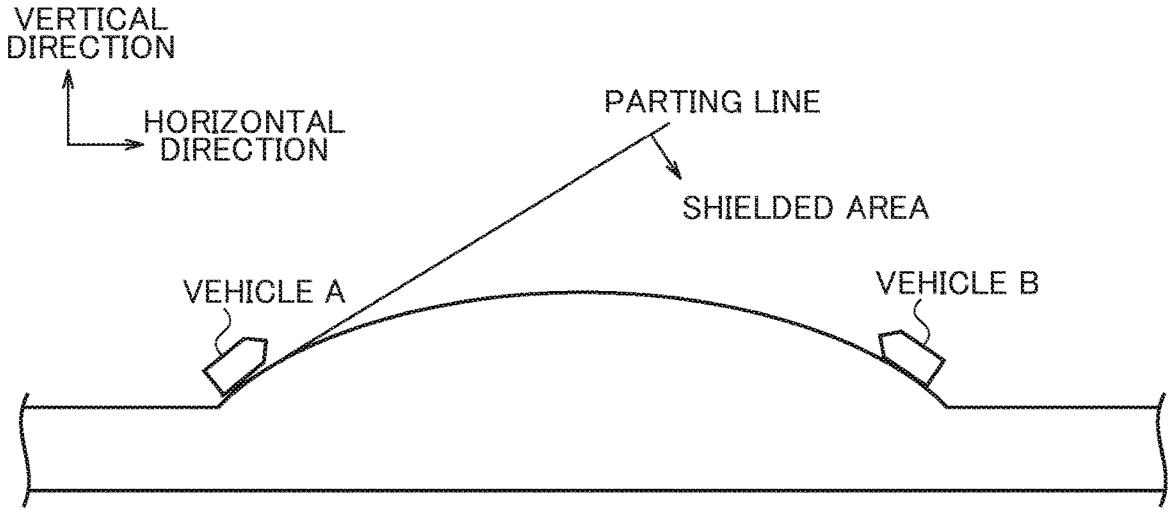
FIG. 23 is a diagram showing an example of a shielded area.

As shown in FIG. 23, the shielded area can be formed even if a convex gradient is present on the road on which the vehicle A travels. In an example shown in FIG. 23, the sensor recognition area calculation unit 16 acquires, from the map 15, the inclination of a position at which the vehicle A travels, and sets a parting line along the inclination. The sensor recognition area calculation unit 16 excludes an area on a vertical lower side of the parting line from the detection range as the shielded area. The parting line may be set in accordance with a view angle of the sensor 22 of the vehicle A. For example, the sensor recognition area calculation unit 16 sets the parting line based on a value obtained by subtracting, from the inclination, the view angle (for example, 10 degrees) of the sensor 22.

Figure 24:
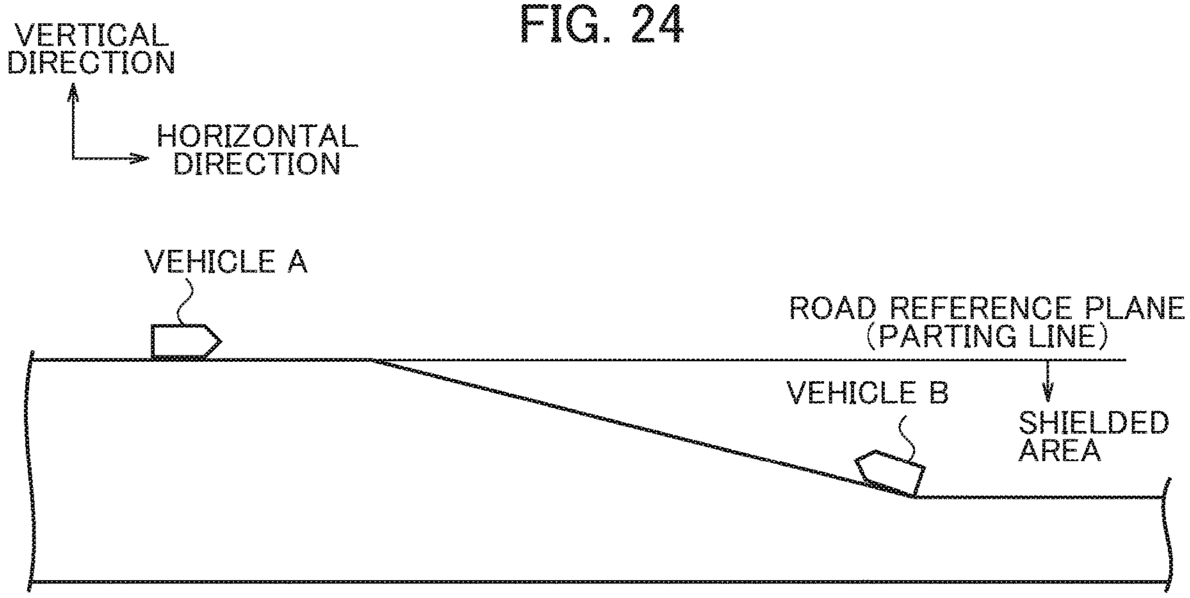
FIG. 24 is a diagram showing an example of a shielded area.

As shown in FIG. 24, the shielded area can be formed even if a difference in height is present ahead of the road on which the vehicle A travels. In an example shown in FIG. 24, the sensor recognition area calculation unit 16 acquires, from the map 15, a road reference plane of the position at which the vehicle A travels, and sets the parting line along the road reference plane. The sensor recognition area calculation unit 16 excludes an area on a vertical lower side of the parting line from the detection range as the shielded area.

As described above, according to the present embodiment, the vehicle B transmits, to the information processing device 10, a transmission request including a distribution range in which an area which is not able to be sensed by the sensor 22 of the vehicle B is an area where the vehicle B requests the transmission of object information. Then, the information processing device 10 selects pieces of object information to be transmitted based on the distribution range and the recognition range of the sensor 22 of the vehicle A. This enables the vehicle B to receive pieces of information on objects that are present only in the area which is not able to be sensed by the sensor 22, and thus, the vehicle B can integrate results obtained by the sensor 22 of the vehicle B, and the received pieces of object information to perform processes such as planning to take a safety action promptly. The transmission of the object information at an appropriate timing becomes possible, because the information processing device 10 transmits the object information in response to the transmission request received from the vehicle B.

According to the present embodiment, the sensor recognition area calculation unit 16 specifies the detection range in which the objects are sensed, and transmits the detection range to the vehicle B. This enables the vehicle B to specify an area that can be covered by the object information obtained from the information processing device 10, among the area which is not able to be sensed by the sensor 22 of the vehicle B, and thus, an area which will continue to be a blind spot area can be easily specified. By the sensor recognition area calculation unit 16 expressing the detection range based on a link represented by a connection between nodes of the road or the lane, a communication volume at the time of transmitting the detection range can be reduced.

According to the present embodiment, the sensor recognition area calculation unit 16 excludes, from the detection range, the shielded area that is not able to be sensed by the sensor 22 of the vehicle A based on the information obtained from the map 15. This can suppress the transmission of unnecessary data and can reduce the communication volume.

REFERENCE SIGNS LIST

10 Information processing device
11 Object detection unit
12 Collision risk calculation unit
13 Object selection unit
14 Collision risk correction unit
15 Map
16 Sensor recognition area calculation unit
21 Self-position measuring unit
22 Sensor
23 Object information collecting unit
24 Object information requesting unit

The invention claimed is:

1. An information processing device comprising:
a communication unit including a communication circuit that communicates with a vehicle; and
a controller that controls the communication performed by the communication unit;
wherein
the controller calculates a collision risk between the vehicle and each of a plurality of objects present around the vehicle and determines a transmission order of object information on each of the plurality of objects such that the object having the higher collision risk is transmitted earlier than the object having the lower collision risk;
the communication unit transmits the object information on each of the plurality of objects to the vehicle in the determined transmission order; and
the vehicle travels according to the transmitted object information.

2. The information processing device according to claim 1, wherein
the controller calculates the collision risk based on a relationship between a lane on which the vehicle travels and a lane on which the object is present.

3. The information processing device according to claim 1, wherein
the controller determines the transmission order of the object information based on a headway time when the vehicle travels by following the object.

4. The information processing device according to claim 1, wherein
the controller determines the transmission order of the object information based on a collision time until the vehicle collides with the object.

5. The information processing device according to claim 1, wherein
the object information includes a position, a speed, a state, and a type of the object.

6. The information processing device according to claim 1, wherein
the controller corrects the collision risk depending on a condition of the object.

7. The information processing device according to claim 1, wherein
the controller receives, from the vehicle, a transmission request for requesting a transmission of the object information.

8. The information processing device according to claim 7, wherein
the transmission request includes information on an area in which the vehicle desires a distribution, and
the communication unit transmits the object information on the object detected in the area.

9. The information processing device according to claim 1, wherein
the object is detected by a sensor of another vehicle.

10. The information processing device according to claim 9, wherein
the communication unit transmits, to the vehicle, a detection range detected by the sensor when the object is detected by the another vehicle.

11. The information processing device according to claim 10, wherein
the detection range is set based on a boundary of a predetermined object.

12. The information processing device according to claim 10, wherein
the detection range is a range from which a predetermined area based on any one of an intersection, a curve, and a gradient inflection point is excluded.

13. The information processing device according to claim 10, wherein
the detection range is set based on a link represented by a connection between nodes of a road.

14. An information processing method performed by an information processing device comprising a communication unit including a communication circuit that communicates with a vehicle, and a controller that controls the communication performed by the communication unit, the information processing method comprising:
calculating a collision risk between the vehicle and each of a plurality of objects present around the vehicle;
determining a transmission order of object information on each of the plurality of objects such that the object having the higher collision risk is transmitted earlier than the object having the lower collision risk;
transmitting the object information to the vehicle on each of the plurality of objects in the determined transmission order, and
wherein the vehicle travels according to the transmitted object information.

15. A non-transitory computer readable storage medium storing a program; that, when executed by a computer, causes the computer to operate as an information processing device comprising a communication unit including a communication circuit that communicates with a vehicle, and a controller that controls the communication performed by the communication unit, the program causing the computer to execute:

calculating a collision risk between the vehicle and each of a plurality of objects present around the vehicle;

determining a transmission order of object information on each of the plurality of objects such that the object having the higher collision risk is transmitted earlier than the object having the lower collision risk;

transmitting the object information to the vehicle on each of the plurality of objects in the determined transmission order, and wherein the vehicle travels according to the transmitted object information.

16. The information processing device according to claim 1, wherein the vehicle is an automated vehicle that travels according to the traveling track plan generated based on the transmitted object information.

17. The information processing method according to claim 14, wherein the vehicle is an automated vehicle that travels according to the traveling track plan generated based on the transmitted object information.

18. The non-transitory computer readable storage medium according to claim 15, wherein the vehicle is an automated vehicle that travels according to the traveling track plan generated based on the transmitted object information.

19. The information processing device according to claim 1, wherein the vehicle travels according to a traveling track plan generated based on the transmitted object information to avoid the objects.

20. The information processing method according to claim 14, further comprising generating a traveling track plan based on the transmitted object information, such that the vehicle travels according to the traveling track plan to avoid the objects.

* * * * *